US012728418B2

(12) United States Patent
Choy et al.

(10) Patent No.: US 12,728,418 B2
(45) Date of Patent: Sep. 8, 2026

(54) SAMPLE PREPARATION CARTRIDGE MODULE

(71) Applicant: HP Health Solutions Inc., Palo Alto, CA (US)

(72) Inventors: Si-Lam J. Choy, Corvallis, OR (US); John Michael Lahmann, Corvallis, OR (US); David Daniel Welter, Corvallis, OR (US)

(73) Assignee: HP HEALTH SOLUTIONS INC., Palo Alto, CA (US)

( * ) Notice: Subject to any disclaimer, the term of this patent is extended or adjusted under 35 U.S.C. 154(b) by 485 days.

(21) Appl. No.: 18/265,657

(22) PCT Filed: Dec. 8, 2020

(86) PCT No.: PCT/US2020/063778

§ 371 (c)(1),
(2) Date: Jun. 6, 2023

(87) PCT Pub. No.: WO2022/125077

PCT Pub. Date: Jun. 16, 2022

(65) Prior Publication Data

US 2024/0042441 A1 Feb. 8, 2024

(51) Int. Cl.
*B01L 3/00* (2006.01)

(52) U.S. Cl.
CPC ... *B01L 3/502761* (2013.01); *B01L 3/502738* (2013.01); *B01L 3/523* (2013.01); *B01L 2200/025* (2013.01); *B01L 2200/04* (2013.01); *B01L 2200/0647* (2013.01); *B01L 2200/16* (2013.01); *B01L 2300/044* (2013.01); *B01L 2300/047* (2013.01); *B01L 2300/087* (2013.01); *B01L 2300/10* (2013.01); *B01L 2400/0406* (2013.01); *B01L 2400/0683* (2013.01)

(58) Field of Classification Search
CPC ......... B01L 3/502761; B01L 3/502738; B01L 3/523; B01L 2200/025; B01L 2200/04; B01L 2200/0647; B01L 2200/16; B01L 2300/044; B01L 2300/047; B01L 2300/087; B01L 2300/10; B01L 2400/0406; B01L 2400/0683; B01L 2200/0621; B01L 2300/043; B01L 2300/123; B01L 2400/0481; B01L 3/502707; B01L 3/5055; B01L 3/50273; B01L 2300/0858
USPC .................................................. 422/502, 500
See application file for complete search history.

(56) References Cited

U.S. PATENT DOCUMENTS

| | | | |
|---|---|---|---|
| 5,279,936 | A | 1/1994 | Vorpahl |
| 6,117,398 | A | 9/2000 | Bienhaus et al. |
| 6,121,055 | A | 9/2000 | Hargreaves |
| 7,632,405 | B2 | 12/2009 | Siddiqi |

(Continued)

FOREIGN PATENT DOCUMENTS

| | | | |
|---|---|---|---|
| CN | 108841818 | A | 11/2018 |
| EP | 3144065 | A1 | 3/2017 |

(Continued)

*Primary Examiner* — Christine T Mui
(74) *Attorney, Agent, or Firm* — FOLEY & LARDNER LLP

(57) ABSTRACT

A sample preparation cartridge module comprises an input and output; and interconnected volumes arranged in series between the input and output, the volumes comprising a fluidic isolation chamber and an output channel connected to the fluidic isolation chamber downstream of the fluidic isolation chamber and leading to the output.

19 Claims, 6 Drawing Sheets

(56) References Cited

U.S. PATENT DOCUMENTS

| | | | |
|---|---|---|---|
| 8,414,845 | B2 | 4/2013 | Chen et al. |
| 8,603,416 | B2 | 12/2013 | Beebe et al. |
| 8,894,946 | B2 | 11/2014 | Nielsen et al. |
| 9,121,058 | B2 | 9/2015 | Stern et al. |
| 9,498,778 | B2 | 11/2016 | Corey et al. |
| 9,551,706 | B2 | 1/2017 | Phillips et al. |
| 9,803,238 | B1 | 10/2017 | Koh et al. |
| 10,005,080 | B2 | 6/2018 | Kayyem et al. |
| 10,053,728 | B2 | 8/2018 | Ririe et al. |
| 10,195,610 | B2 | 2/2019 | Tang et al. |
| 10,471,408 | B2 | 11/2019 | Jones et al. |
| 10,525,467 | B2 | 1/2020 | Nielsen et al. |
| 2002/0134175 | A1 | 9/2002 | Mehra et al. |
| 2005/0069459 | A1 | 3/2005 | Ahn et al. |
| 2011/0186466 | A1 | 8/2011 | Kurowski et al. |
| 2012/0107811 | A1 | 5/2012 | Kelso et al. |
| 2012/0164750 | A1 | 6/2012 | Gjerde et al. |
| 2013/0251952 | A1 | 9/2013 | Smith et al. |
| 2014/0261708 | A1 | 9/2014 | Wright et al. |
| 2015/0118728 | A1 | 4/2015 | Rahman et al. |
| 2016/0016140 | A1 | 1/2016 | Jovanovich et al. |
| 2016/0069919 | A1 | 3/2016 | Holmes et al. |
| 2016/0130640 | A1 | 5/2016 | Wright et al. |
| 2016/0263577 | A1 | 9/2016 | Ismagilov et al. |
| 2017/0122851 | A1 | 5/2017 | Thatcher et al. |
| 2017/0340843 | A1 | 11/2017 | Harris et al. |
| 2018/0161769 | A1 | 6/2018 | Kayyem et al. |
| 2019/0001325 | A1 | 1/2019 | Pais et al. |
| 2020/0108388 | A1 | 4/2020 | Nielsen et al. |

FOREIGN PATENT DOCUMENTS

| | | | |
|---|---|---|---|
| KR | 10-2033701 | B1 | 10/2019 |
| WO | 89/05456 | A1 | 6/1989 |
| WO | 02/57798 | A2 | 7/2002 |

SAMPLE PREPARATION CARTRIDGE MODULE

CROSS-REFERENCE TO RELATED APPLICATIONS

This application is filed under 35 U.S.C. § 371 as a National Stage of PCT International Application No. PCT/US2020/063778, filed Dec. 8, 2020, which is incorporated by reference herein in its entirety.

BACKGROUND

In biomedical, chemical, and environmental testing, isolating a component of interest from a sample fluid can be useful. Such separations can permit analysis or amplification of a component of interest. As the quantity of available assays for components increases, so does the demand for the ability to isolate components of interest from sample fluids.

BRIEF DESCRIPTION OF DRAWINGS

Non-limiting examples will now be described with reference to the accompanying drawings, in which.

DETAILED DESCRIPTION

In biological assays, a biological component can be intermixed with other components in a biological sample that can interfere with subsequent analysis. As used herein, the term "biological component" can refer to materials of various types, including proteins, cells, cell nuclei, nucleic acids, bacteria, viruses, or the like, that can be present in a biological sample. A "biological sample" can refer to a fluid or a dried or lyophilized material obtained for analysis from a living or deceased organism. Isolating the biological component from other components of the biological sample can permit subsequent analysis without interference and can increase an accuracy of the subsequent analysis. In addition, isolating a biological component from other components in a biological sample can permit analysis of the biological component that would not be possible if the biological component remained in the biological sample. In this context, "Isolation" can also be referred to as "purification", whereby biological component may be separated from the rest of the biological sample after introduction to the cartridge module. It will be understood that the isolated biological component may be output in association with (e.g., bound to) particulate substrate and a reagent solution, or the like. The isolation or purification refers to the separation of the biological component from other components of the biological sample with which it was originally introduced in the cartridge module, but it does not mean that the biological component is completely isolated when it is dispensed. For example, isolation refers to the fact that the biological component is sufficiently separated or "purified" from other components of the original biological sample to facilitate further processing such as detection and/or amplification.

Certain existing modules comprise complex multiplexed structures of clinical steal and patterned elastomer sealing layers that provide for multiple process chambers fluidically connected through microfluidic channels. A layer of fluidic drive circuitry including microfluidic pumps and electrodes moves the fluids through these channels and chambers. The separate processes in the chambers facilitate isolation of the biological component from the sample. Isolating a biological component with some of these techniques can be costly, complex, time consuming, and labor intensive and can also result in less than maximum yields of the isolated biological component. The fact that this disclosure a "biological component" in the singular sense also includes multiple biological components (e.g., nucleic acids) in the plural sense.

Figure 1:
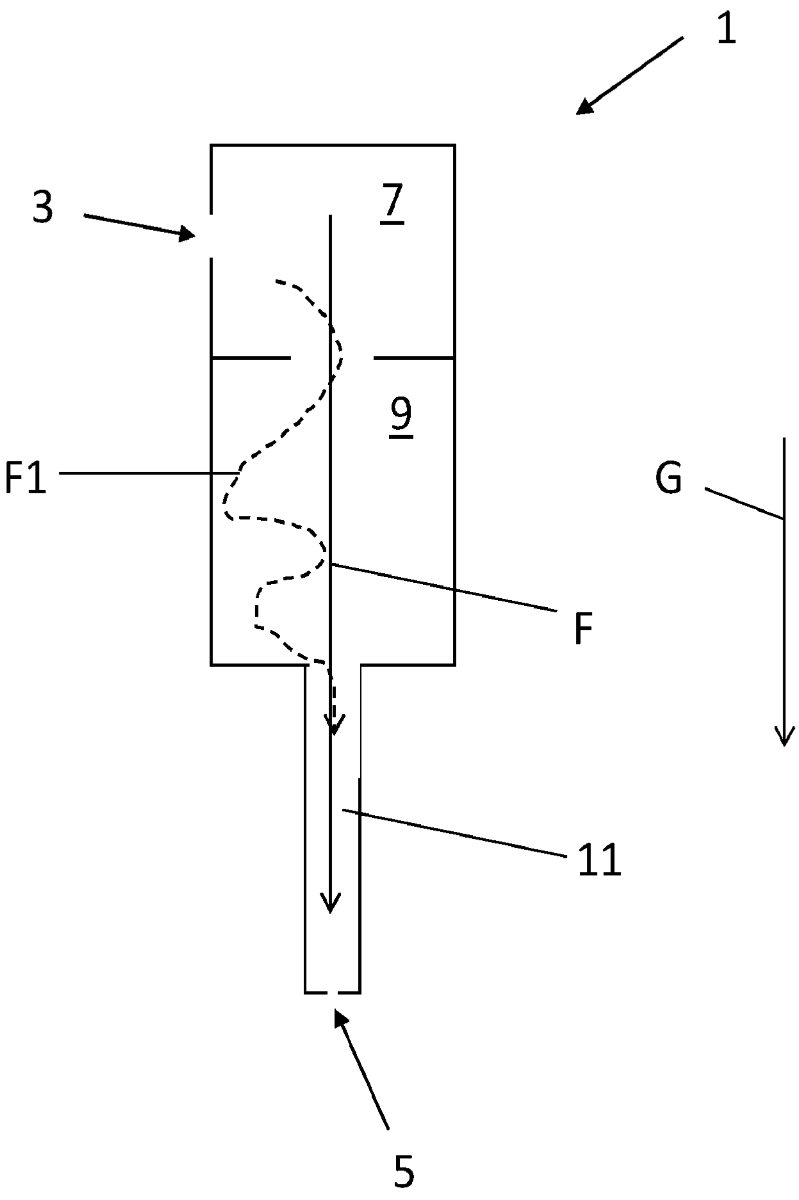
FIG. 1 illustrates a diagram of an example of a sample preparation cartridge module.

FIG. 1 illustrates an example of a sample preparation cartridge module 1. The module 1 may be adapted to facilitate isolating a biological component from an inserted biological sample. The illustrated example module 1 is illustrated in an upright use orientation.

The module 1 comprises a biological sample input 3. The input 3 may comprise an openable and closeable throughput to receive a biological sample. The input 3 is provided near an upper upstream region of the module 1.

A swab can be used to take biological sample from a human or from any surface. The hence obtained biological sample may be held in a binding buffer, for example, at least previously, together with at least a part of the swab to elute the biological sample in the binding buffer. The binding buffer with biological sample may be introduced in the module 1 through the input 3.

The biological sample comprises a biological component. As will be addressed below, a particulate substrate is configured to be associated with the biological component, to isolate the biological component from the biological sample. In one example, the particulate substrate comprises paramagnetic beads and/or any magnetizing particle. In one example, the biological component comprises nucleic acids such as DNA and/or RNA that may be extracted from the biological sample by lysing, bound to magnetic particulate substrate, and separated from the lysate and dragged towards an output 5 by an externally generated (para)magnetic force. (Para)magnetic forces may be generated by a host station into which the cartridge module 1 is to be installed.

Lysate may refer to the fluid containing the material resulting from the lysis of a biological sample. Such lysis may release the biological component that is contained therein. Lysing itself may include mixing and/or heating the biological sample, chemically lysing the biological sample, and/or a combination of the foregoing. In this disclosure, the action of mixing may be for one or both of (i) lysing the biological sample and (ii) associating the biological components with particulate substrate.

In the mixing chamber, microbes are lysed (broken open) to release nucleic acids. After such lysing free nucleic acids can be associated with the magnetic beads. The "lysate" is the result of the lysing.

The module 1 comprises an output 5 for outputting a processed sample, for example including the isolated biological component. The output 5 is provided downstream of the module 1. The processed sample including the biological component may be dispensed from the output 5 after isolation. In certain examples the biological component is dispensed while associated with the particulate substrate, however, in other examples, the biological component can be disassociated from the particulate substrate before dispensing whereby the biological component can be dispensed and the particulate substrate can be retained. The output 5 may be provided with a seal valve that can be opened for dispensing.

As illustrated, the module 1 comprises interconnected volumes 7, 9, 11 arranged in series between said input 3 and output 5, along a linear direction F. For example, the volumes 7, 9, 11 are stacked along the linear direction F, whereby "stacked" means that the volumes are arranged in series along a fluid or particle flow path. At least two of the volumes 7, 9, 11 may be defined by a single integral structure and/or openly connect to each other (at least in use) wherein each volume 7, 9 or 11 may define a different function as will be explained below. In the drawing the module 1 has an upright orientation, which may correspond to a use orientation, whereby the volumes 7, 9, 11 are stacked vertically. During use the volumes 7, 9, 11 can be in open fluidic connection with each other.

The linear direction F may correspond to a general end-to-end direction of movement of fluids, down the volumes 7, 9, 11, between the input 3 and output 5. However, in practice, particulate substrate may be dragged back and forth, zig-zag, etc., in those volumes 7, 9, 11, and walls of the volumes may incline. Turbulences and deviations from a general movement path may be promoted inside the volumes 7, 8, 9 by mixing or magnetic forces. Fluid flows like turbulences may temporarily be created in the fluids, like for mixing or when a fluid falls on top of another fluid. An example fluid/particle flow F1 is illustrated by an additional dotted arrow F1. Also, the module 1 need not be symmetrical and the interfaces between the volumes 7, 9, 11 need not be exactly linearly aligned. The linear direction F is mentioned to for explanatory reasons and as a reference, but should not be interpreted as limiting. In use, the linear direction F may be approximately parallel, or at a small angle with respect to, the direction of gravity G.

The volumes comprise a mixing chamber 7, a fluidic isolation chamber 9 and an output channel 11. The mixing chamber 7 is connected to the input 3 to receive the biological sample. The mixing chamber 7 may be adapted to contain and mix a composition comprising the biological sample, and a particulate substrate, to associate the particulate substrate with the biological component of the biological sample. The mixing chamber 7 may be supplied with a lysing agent. Reagent or buffer may be provided in the mixing chamber 7 to facilitate lysing of the biological sample to isolate the biological component from the biological sample. The mixing may comprise mixing and/or heating. The mixing may be to lyse the biological sample and/or to associate the biological component with the particulate substrate. During lysis, the biological sample may be broken apart to isolate the biological component.

Figure 3:
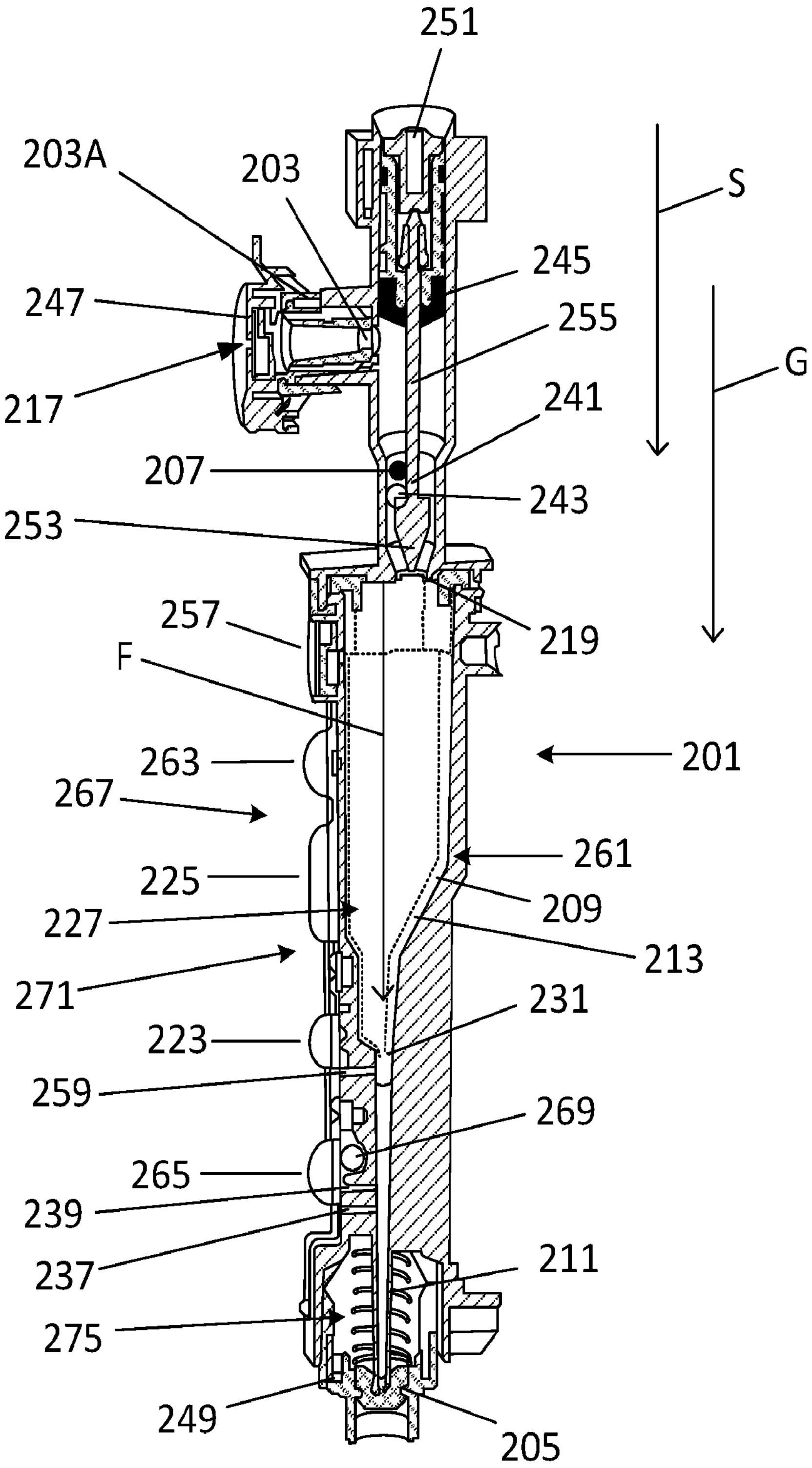
FIG. 3 illustrates a cross section of an example of a sample preparation cartridge module.
Figure 4:
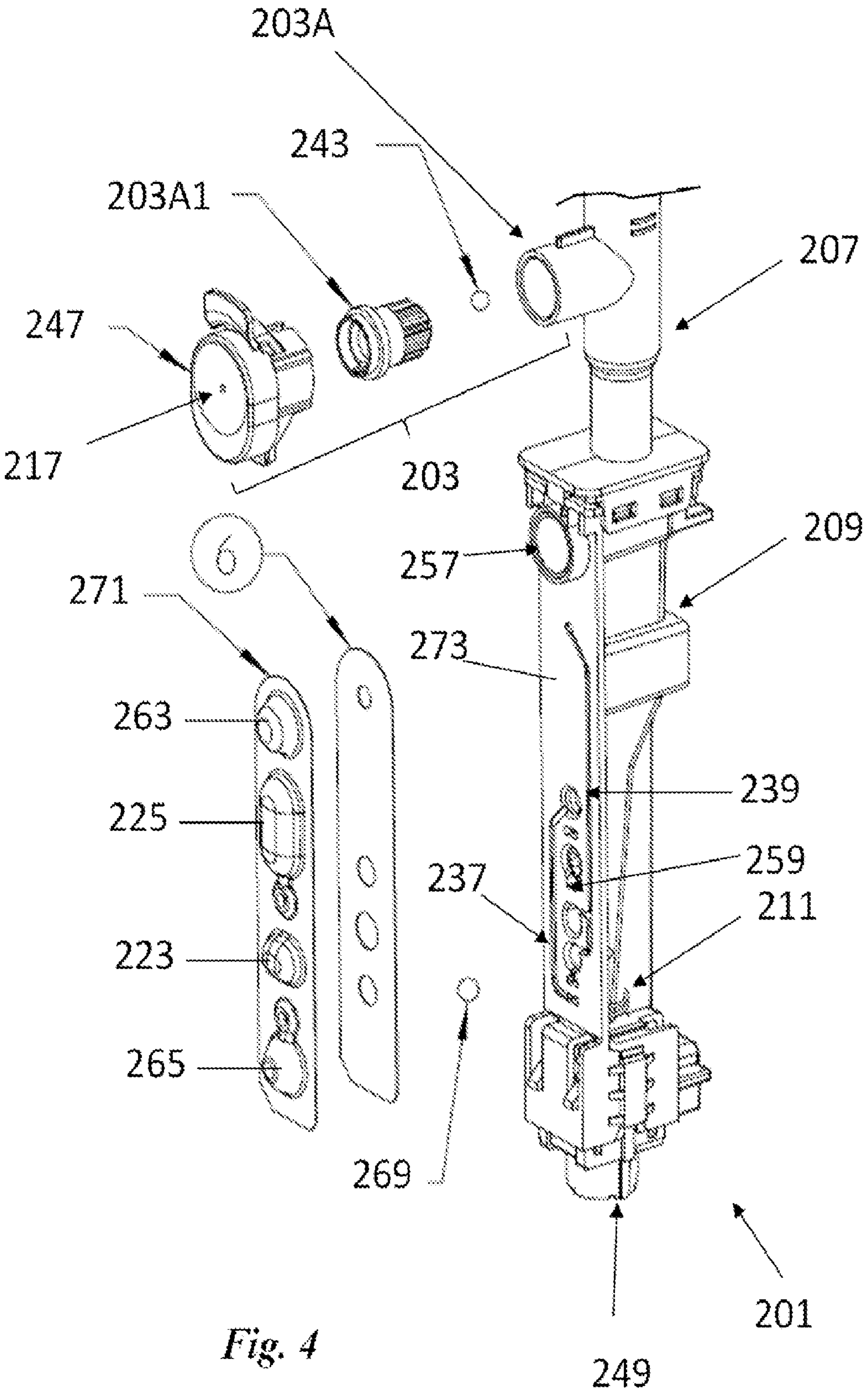
FIG. 4 illustrates a partial exploded view of an example of a sample preparation cartridge module.

The reagent for the mixing chamber can be a dry reagent or a fluid reagent. The dry reagent and/or the fluid reagent can include a reactant useful to mix with a biological component for further analysis. Lyophilized reagent pellet 243 of FIGS. 3 and 4 is an example of a dry reagent useful for lysis, which may be reconstituted using the binding buffer in which the biological sample may be eluded. In one example, the reactant can be selected from PCR master mix, nucleic acid primers, deoxynucleosides, triphosphates, reverse transcriptase, secondary antibodies, polymerases, enzymes, polymerases, probes, magnesium salt, bovine serum albumin (BSA), beads, or a combination thereof. PCR master mix can include a mixture of multiple compounds that are used in a PCR assay. These compounds can include DNA polymerase, nucleoside triphosphate, deoxyribose nucleoside triphosphate, magnesium chloride, magnesium sulfate, template DNA, forward primer, reverse primer, tris hydrochloride, potassium chloride, and others. In certain examples, the reactant can be a lyophilized PCR master mix. Examples of commercially available PCR master mixes can include TITANIUM TAQ ECODRY™ premix, ADVANTAGE 2 ECODRY™ premix (available from Takara Bio, Inc. Japan); Lyophilized Ready-to-Use and Load PCR Master Mix (available from Kerafast, Inc., USA); MAXIMO™ Dry-Master Mix (available from GenEon Technologies, USA), and others.

The fluidic isolation chamber 9 is connected to the mixing chamber 7 downstream of the mixing chamber 7, to receive the biological sample from the mixing chamber 7. The fluidic isolation chamber 9 may be adapted to separate the particulate substrate with associated biological component from the lysed biological sample. The output channel 11 may be fluidically connected to the fluidic isolation chamber 9 downstream of the fluidic isolation chamber 9 and may lead to the output 5, for example to dispense the isolated biological component.

At least one valve may provide for a barrier between subsequent volumes 7, 9, 11, for example, the barrier to be removed at an appropriate time for opening the fluidic connection between upstream and downstream fluids and particles. For example, one valve may be provided between the mixing chamber 7 and fluidic isolation chamber 9, to open after mixing and heating has taken place, for releasing the mixed fluid sample towards the fluid isolation chamber 9.

In an example, the fluidic isolation chamber 9 is adapted to facilitate purifying the biological component from the biological sample. For example, in the fluidic isolation chamber 9 nucleic acids are purified and/or isolated from the biological sample by separating the magnetic beads with the nucleic acids bound thereto from the lysed sample. In one example, a wash buffer is provided in a downstream portion of the fluidic isolation chamber 9 onto which the pre-mixed biological sample is supplied from the mixing chamber 7. The beads and nucleic acids can be separated from the lysate and dragged through the wash buffer and through the output channel 11, using an externally controlled (para)magnetic field. The beads and nucleic acids may be dispensed from the output 5 for further examination, such as, for example, amplification and detection of the nucleic acids.

The wash buffer can be an aqueous solution. For example, a wash buffer can include water, alcohol (such as ethanol), a binding agent, a salt, a surfactant, a stabilizing agent, buffering agents to maintain pH, or a combination thereof. For example, fragments and other materials from the biological sample that may be adhere to the magnetizing particles at locations other than the interactive surface group or the ligand on the exterior surface thereof can be washed off by the wash buffer. The wash buffer can be a liquid that can wash off these materials without affecting the integrity of the biological component.

The example cartridge module 1 of FIG. 1 may provide for a relatively cheap disposable module 1 for biological component isolation. The example cartridge module 1 may provide for a relatively fast isolation process. For example by being designed an upright use orientation, at least partially using gravity for fluid flow, a less complex and relatively fast isolation process is obtained. A density gradient column may be used in the fluidic isolation chamber 9. Lower density lysed biological sample may be released from the mixing chamber 7 on top of a higher density wash buffer pre-supplied to a bottom portion of the fluidic isolation chamber 9 whereby the paramagnetic beads with biological component can be dragged through the wash buffer into the output channel 11, separated from the lysate on top of the wash buffer. Herein, the density refers to an average weight per volume of the respective fluid. With such density gradient column a relatively fast and cost efficient purification process module can be achieved. A fluidic module of reduced complexity may be provided using relatively cost efficient, moldable materials and design. In one example, relatively free and open fluidic connections may be provided between the volumes without a need of microfluidic or electrode actuators, although in certain other examples these could be added.

Figure 2:
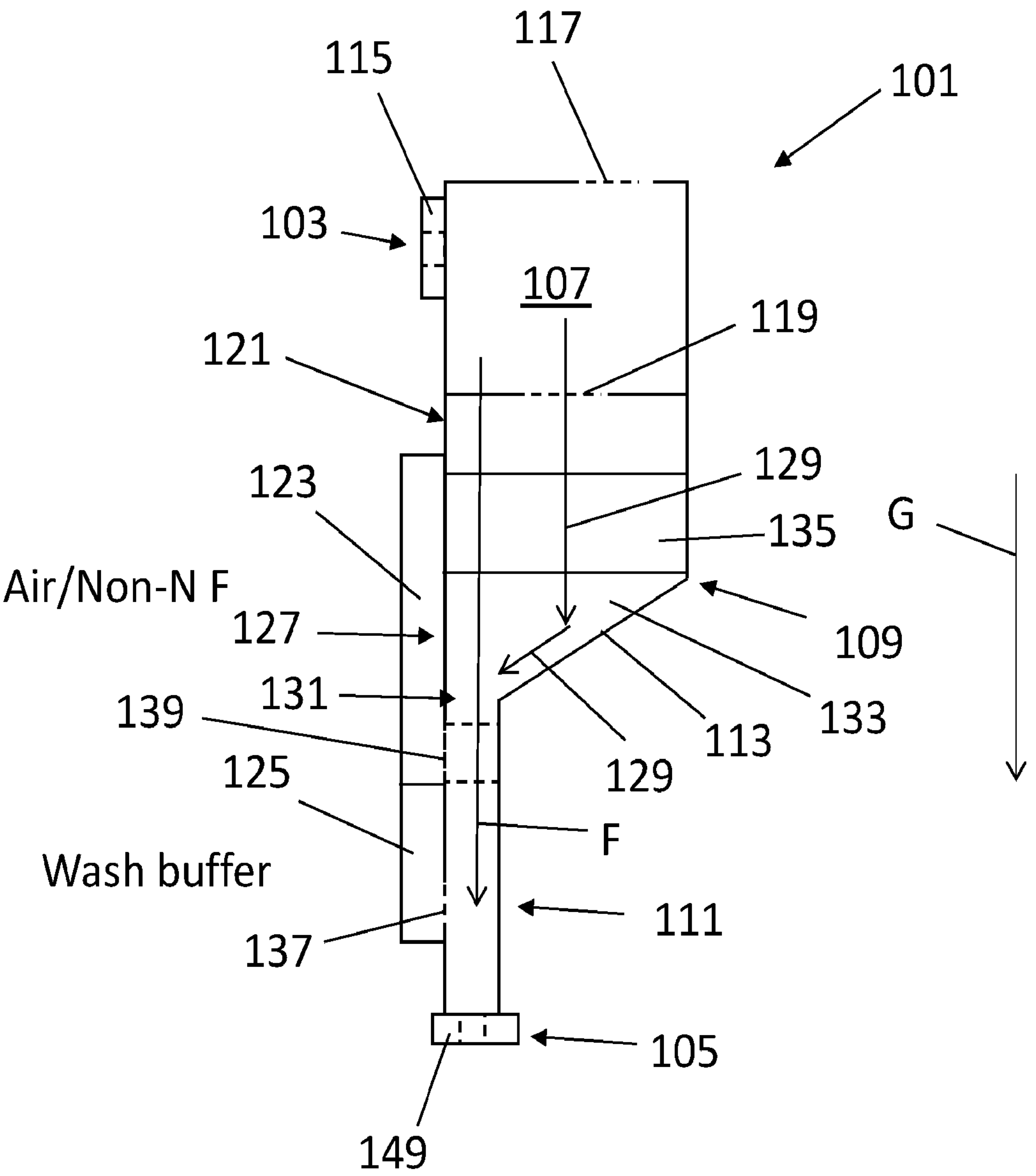
FIG. 2 illustrates a diagram of another example of a sample preparation cartridge module.

FIG. 2 illustrates another example of a cartridge module 101 having similar aspects as the previously explained example of FIG. 1. The volumes 107, 109, 111 of the module 101 of FIG. 2 may be arranged to, during use, directly fluidically communicate, without fluid channels in between, to facilitate free fluid and particle flow between the volumes, for example, along a direction of gravity G. In this example, this means that fluids and/or particles may flow along surfaces that are parallel to and/or at obtuse angles with a linear direction F to avoid trapping and/or impeding the flow of fluids and particles, but it does not exclude movements in different directions including, for example, zig-zag movements having horizontal and vertical components (for example, as induced by the magnetic forces), or turbulences (for example, in the mixing chamber or when mixed sample fluid is release on top of wash buffer) or other deviations from the general flow path. The particulate substrate may be dragged downwards along the volumes by magnetic forces. The fluidic isolation chamber 109 may comprise a ramp 113. A fluid flow direction along that ramp 113 is herein also considered as following a direction of gravity G because the direction of flow 129 of the fluids or particles along the ramp 113 has a vertical component. The module 101 is illustrated in upright orientation but could also be inclined with respect to the direction of gravity G while still facilitating a general fluid flow that has a component in the direction of gravity G, whereby the linear direction F could be at an angle with the direction of gravity.

A sample input 103 is fluidically connected to the mixing chamber 107. For example, the sample input 103 comprises a re-closable lid or seal 115. The sample input 103 may facilitate inserting a swab of a biological sample and/or a buffer into the mixing chamber 107. Lysing reagent and/or particulate substrate may be provided in the mixing chamber 107. In one example, the mixing chamber 107 is a mixing and heating chamber adapted to exchange heat and/or cold. A host station may be provided with external heaters to heat the mixing chamber 107 either by air or by direct contact. Walls of the mixing chamber 107 may facilitate heating and cooling its contents through air or contact. Mixing and lysing may be stimulated by heating, creating temperature differences, by vibrations, or by increasing pressure or changing pressures over time. The module 101 may comprise at least one air vent 117 that is connected to the mixing chamber 107. The air vent 117 is adapted to allow air to pass while inhibiting liquids and solids to pass, for example communicating with ambient air. The module 101 may comprise a valve 119 between the mixing chamber 107 and fluidic isolation chamber 109. The valve 119 may be closed during said mixing/heating of the biological sample with particulate substrate and/or lysing reagent. The valve 119 may be adapted to be opened to release the mixed composition into the fluidic isolation chamber 109. The valve 119 may be configured to be opened by generating pressure or by mechanical rupture, tear or piercing. The valve 119 may be a tear film.

In one example of a biological component isolation process, a wash buffer 133 is released in the fluidic isolation chamber 109, in a downstream portion 127 of the fluidic isolation chamber 109, prior to releasing the mixed composition from the mixing chamber 107 into the fluidic isolation chamber 109, so that the mixed composition 135 containing the biological component and particulate substrate is released from the mixing chamber 107 into the fluid isolation chamber 109 on top of the wash buffer 133. The wash buffer 133 may have a higher density than the sample fluid 135. Prior to occupying a downstream portion of the fluidic isolation chamber 109, the wash buffer 133 may be contained in a supply source 125 of the module 101 and the mixing chamber 107. The particulate substrate and its associated biological component is separated from the sample fluid 135 by moving the particulate substrate, for example, approximately along a direction of flow 129 to the output channel 111 while the rest of the sample including the lysate may remain, at least mostly, on top of the wash buffer 133. The illustrated wash buffer 133 and mixed lysate/sample fluid 135 are illustrated after opening respective valves to release the wash buffer 133 and lysate 135.

The module 101 may have a narrow form factor, for example the mixing chamber 107, fluidic isolation chamber 109 and output channel 111 may have a total height, as measured in the linear direction F, being at least three times a maximum width of the widest volume. Walls that define the fluid volumes 107, 109, 111 may be, at least partly, rounded to avoid trapping fluids or particles. In one example the volumes 107, 109, 111 may include a substantially straight wall 121 at one lateral side, for example where sources 123, 125 of suppliable fluids are provided. In this disclosure, sources 123, 125 may include containers to contain one or more of buffers, reagents or gases for supplying the mixing and isolation process. In one example, the sources 123, 125 may be part of a blister pack (e.g., FIG. 3). However, a source 123, 125 may include any type of container, reservoir or pouch suitable to supply the contents to the module 101.

As illustrated, the fluidic isolation chamber 109 may comprise at least one partially converging wall that is parallel to and/or at obtuse angles with the linear direction F to avoid trapping and/or impeding the flow of fluids and particles. The ramp 113 may be part of the rounded walls. The ramp 113 may be provided opposite to the sources 123, 125. In the illustrated example, the ramp 113 is provided at a lateral side in a downstream portion 127 of the fluidic isolation chamber 109. The ramp 113 extends, in a use and/or upright orientation of the module 101, right below an output of the mixing chamber, as diagrammatically illustrated by fluid flow arrows 129. For example, this may facilitate that, when the valve 119 opens, the mixed sample including lysate and particles is released from the mixing chamber 107 above the ramp 113 rather than above an entrance 131 to the output channel 111. For example, the fluidic isolation chamber 109 comprises a ramp 113 at one lateral side, the ramp extends across at least a downstream portion 127 of the fluidic isolation chamber, to, on the one hand, receive mixed composition below an output of the mixing chamber in an upright orientation of the cartridge module 101, and, on the other hand, facilitate the transition of the fluidic isolation chamber 109 into the output channel 111 to guide a fluid sample into the output channel 111. As illustrated, the fluidic isolation chamber 109 may converge in the linear direction F to transition into the output channel 111. The output channel 111 may comprises a capillary channel that provides for capillary action. The output channel 111 may comprise an output tip 105 at its downstream end, for dispensing biological component, sealed by an openable seal cap 149. The output tip 105 may be opened by piercing or otherwise opening the cap 149 and in some examples may be resealed by the same cap 149 after the dispense action.

In an example, the module 101 includes at least one source 123, 125 the contents of which comprise at least one of buffers, reagents, (lyophilized or wet) reagents, non-newtonian fluid and/or gas. The contents of the sources 123, 125 are to be released into the respectively volumes 109, 111. Openable seals or valves 137, 139 may act as barriers between the volumes 109, 111 and the sources 123, 125. A source 125 of wash buffer may be connected to a downstream portion 127 of the fluidic isolation chamber 109, so that upon opening the valve 137, the wash buffer is released into the fluidic isolation chamber 109 and/or output channel 111, as illustrated by reference number 133. The mixed sample 135 can be released from the mixing chamber 107 on top of the wash buffer 133.

The contents of at least one other source 123 may comprises a gas and/or non-newtonian fluid, for example to be released into the output channel 111 after the separation. For example, once a portion of the particulate substrate is moved closer to the output, the contents may be released into the capillary output channel 111 to form an air bubble barrier and/or non-newtonian fluid plug (e.g., grease plug). This may prevent that upstream fluids such as lysate 133 may contaminate the processed sample fluid containing the biological component bound to the particulate substrate at the bottom of the output channel 111.

A non-newtonian plugging fluid can include a Bingham plastic, a viscoplastic, or a shear thinning fluid. Bingham plastics can include materials that behave as rigid bodies at low stress but which flow as a viscous fluid at high stress. The transition between the rigid body behavior and the viscous fluid behavior can occur at various different stress levels, depending on the particular Bingham plastic material. Bingham plastics can include greases, slurries, suspensions of pigments, and others. Viscoplastics are a broader category of materials that can include Bingham plastics. Viscoplastic materials can experience irreversible plastic deformation when stress over a certain level is applied. When stress under this level is applied, the viscoplastic material can behave as a rigid body, as is the case with Bingham plastics, or the viscoplastic material can undergo reversible elastic deformation. Shear thinning fluids are materials that behave as a fluid with a high viscosity when low stress is applied, but the viscosity of the fluid decreases when the stress is increased. Examples of shear thinning fluids can include polymer solutions, molten polymers, suspensions, colloids, and others. In one example, the non-newtonian plugging fluid can include a mineral oil-based grease, a vegetable oil-based grease, a petroleum oil-based grease, a synthetic oil-based grease, a semi-synthetic oil-based grease, a silicone oil-based grease, or a combination thereof. Certain properties of examples of non-newtonian fluids in the context of this disclosure will be further addressed below.

FIG. 3 illustrates another example of a pre-assembled, pre-usage cartridge module 201. Herein, pre-usage implies that the biological sample has not yet been inserted, nor have the sources 225, 223, 263, 269, 265 released their contents in the volumes 207, 209, 211. For example, prior to usage the volumes 207, 209, 211 are dry. The same example module 201, or at least a portion thereof, is illustrated in a partially exploded view in FIG. 4. The cartridge module 201 includes fluidically interconnected volumes 207, 209, 211. The module 201 is illustrated in an upright orientation which may be its use orientation. The volumes include a mixing and heating chamber 207, a fluidic isolation chamber 209 and an output channel 211. These volumes 207, 209, 211 may be serially arranged along a linear direction F, which direction F may be approximately vertically during the isolation process. These volumes 207, 209, 211 may be fluidically interconnected when a respective seal valve 219 is opened. A seal film 219 is provided at the bottom of the mixing chamber 207, at the entrance to the fluidic isolation chamber 209. In one example, the fluidic isolation chamber 209 is adapted to provide for a density gradient column of lysate and wash buffer to facilitate a nucleic acid purification process using paramagnetic beads. However, the same module 201 and selective example features could be used for isolating other biological components.

The mixing and heating chamber 207, mixing chamber 207 in short, may include a biological sample input 203. The input 203 is adapted to receive a biological sample and/or swab. The input 203 may include an input channel 203A such as a cylindrical entrance channel or neck and a seal cap 247 that seals the input 203. As illustrated in FIG. 4, the input channel 203A may comprise a seal component 203A1 to seal against to the seal cap 247 in closed position. A central axis of the input channel 203A may extend at an angle with the linear direction F along which the volumes 207, 209, 211 are serially disposed and/or at an angle with respect to the direction of gravity G in a use orientation, whereby the angle may be, approximately, a straight angle with said direction(s), or between approximately 60 and 90 degrees, meaning that the biological sample may be inserted approximately horizontally, or inclined slightly downwards with the input 203 opening at a higher point. The seal cap 247 may be adapted to seal, open and reseal the input opening so that the cap 247 may impede contamination of the mixing chamber 207 before and after the biological sample has been inserted. An air vent 217 may be provided to the mixing chamber 207 to vent with respect to ambient air while inhibiting liquid from exiting or entering the mixing chamber 207. In this example the air vent 217 may be provided in the cap 247. For example a hole is provided in the cap 247 with a liquid tight air venting membrane against the inner side of the cap 247.

In one example, the biological sample may have been previously eluted in a binding buffer prior to insertion in the mixing chamber. The binding or another buffer and/or sample may reconstitute a lyophilized lysing reagent and/or lyophilized paramagnetic beads. The buffer may form a fluid reagent from the dry reagent to promote lysing. The mixing may facilitate the reconstitution. After the biological sample breaks due to lysing, the mixing may promote association of the paramagnetic beads with the biological component. In one example, prior to usage of the module 201, the volumes 207, 209, 211 are substantially dry. Prior to usage may refer to any point in time before one of the valves, caps or seals of the module has been broken, for example, after manufacturing and sealing, during shipment and/or during storage before usage. Prior to usage, the dry volumes 207, 209, 211 may contain at least one relatively dry lyophilized reagent and/or lyophilized paramagnetic beads 243. For example, up to the point of inserting the biological sample and/or binding buffer in the mixing chamber 207 through the input 203, and prior to supplying the wash buffer into the fluidic isolation chamber 209 or output channel 211 from a connected source 225, the volumes 207, 209, 211 are substantially dry. For example, prior to usage, when valves of the module are in closed and/or sealed and/or unopened condition, the volumes 207, 209, 211 may be dry. These valves may include valves 247, 249 that seal the input 203 and/or output 205 (sometimes referred to as caps or seal throughout this disclosure); valves 219 between chambers 207, 209; and/or valves that seal the sources 223, 225 up until release into the respective volumes. The lyophilized reagent and/or lyophilized paramagnetic beads 243 may remain dry in the mixing chamber 207 until the binding buffer and biological sample are inserted. The lyophilized reagent and/or beads 243 may be provided in the mixing chamber 207 before usage as a single lyophilized pellet or as a plurality of lyophilized pellets.

In this disclosure, sources of reconstitution buffers may be provided, for example for a lyophilized lysing reagent in the mixing chamber and/or for a master mix reagent for the output channel 211. Reconstitution buffers can be aqueous solvents. In one example the reconstitution buffer can be water. In other examples, the reconstitution buffer can include additional ingredients, such as salts, surfactants, buffering agents to maintain pH, and others. A reconstitution buffer can be used to mix with a dry reagent to form a reconstituted fluid reagent.

As illustrated in FIG. 3, in an example the mixing chamber 207 comprises a pressure source 245. The pressure source 245 may comprise a plunger or piston. The pressure source 245 may be adapted to pressurize the mixing chamber 207 to move the fluids and particles (e.g., lysate) towards the fluidic isolation chamber 209, for example when opening the downstream valve 219 that seals the mixing chamber 207 with respect to the downstream fluidic isolation chamber 209. In other examples (not illustrated) the pressure source 245 may pressurize and move to fluids along the fluid flow direction that is not necessarily parallel to a gravity direction.

The pressure source 245 may include a piston or plunger, as indicated by the same reference number 245 in FIG. 3. The piston may include a seal member adapted to seal against the inner walls of the mixing chamber 207 while allowing sliding of the piston in the mixing chamber 207. The external contour of the piston may match the inner contour of the mixing chamber to slide against the inner walls of the mixing chamber 207. The pressure source 245 may include an actuator 251 to externally actuate the pressure source 245. In one example, the actuator 251 may be adapted to be engaged by a corresponding component of the host station. The actuator 251 may extend at a vertical top of the module 201, in the upright orientation.

The mixing chamber 207 may include a mixer 241 and mixer actuator 251 to actuate the mixer 241. The mixer 241 may comprises a paddle and/or screw or the like to be rotated for mixing the fluids and particles. The mixing may comprise, subsequently, reconstitution, lysing, and binding of the biological components to the particulate substrate. The mixing chamber 207 may further comprise a valve actuator 253 to open a valve between the mixing chamber 207 and the downstream connected fluidic isolation chamber 209. The valve actuator 253 may comprise a puncture element such as a relatively sharp end. In one example the mixer 241 and the valve actuator 253 may be made of an integral component, such as the paddle. In a further example, the pressure source 245, mixer 241 and valve actuator 253 may be operated through the same actuator 251. For example, the actuator 251 may facilitate sliding of the piston and valve actuator 253 in the slide direction S, and rotation around the same slide direction S. In another example, the assembly of piston and valve actuator 253 may operate separately. For example, the piston may slide further downwards while the valve actuator 253 remains still, for example after the seal valve 219 has been punctured already. For example, an axle 255 is provided between the paddle and piston for said sliding and/or rotation in and/or around the slide direction S, respectively, with its central axis along the slide direction S, which, in a use orientation of the module 1, may be parallel to the earlier mentioned linear direction F and/or direction of gravity G, at least approximately.

In one example, the valve 219 between the mixing chamber 207 and fluidic isolation chamber may comprise a burstable seal film, for example heat staked against an upper inner wall or ceiling of the fluidic isolation chamber 209. In an example, the valve 219 is to burst open under pressure of the pressure source 245 and/or may be cut open and/or broken by mechanical actuation of the valve actuator 253.

In the illustrated example, a downstream portion (e.g., lower portion at the bottom in illustrated upright orientation) of the mixing chamber 207 converges towards a relatively small output opening of the mixing chamber 207 that is to fluidically interface with the fluidic isolation chamber 209. As illustrated in FIG. 3, a converging bottom of the mixing chamber 207, as well as the output opening, extend just above the valve 219 and just below the bottom end of the valve actuator 253. The valve actuator 253 may also have a converging shape, for example towards a relatively pointy end, to accommodate to the converging wall(s) of the bottom of the mixing chamber 207.

The fluidic isolation chamber 209 may be adapted to receive and hold wash buffer in at least a downstream portion thereof, to receive the mixed fluids (e.g., lysate, biological sample, biological component and particulate substrate) after mixing from the upstream mixing chamber 207, and to isolate the biological component and particulate substrate from the rest in the wash buffer. During usage, not-isolated remainder fluids and particles such as remainder lysate may remain or float on top of the wash buffer, for example because of the different densities of the lysate versus the wash buffer, also referred to as density gradient. The bound and isolated particles may move towards the output 205 in the wash buffer by means of the external paramagnetic field. The isolated biological component may be dispensed from the output 205. It will be understood that in example non-ideal situations certain amounts of particulate substrate and/or biological component may accidentally not continue their path to the output 205 for isolation, for example remaining on top of the wash buffer, while sufficient biological components may still follow their appropriate path for isolation at the output 205.

At least one continuous inner wall surface of the volumes 207, 209, 211, between the input 203 and output 205, may be relatively smooth and void of straight angles with respect to the linear direction F. and/or direction of gravity G in an example upright use orientation. Exceptionally, supply channels 237, 239, 259 that open into a lateral inner wall, the supply channels 237, 239, 259 provided to supply source fluids (e.g., buffers, plug-fluids, gasses, reagents) or pellets (e.g., lyophilized reagent) to the respective volumes, provide for openings in the otherwise relatively smooth walls. For example, the magnetic field may be generated at the opposite lateral side 261 of entrances to the volumes 211 of the supply channels 237, 239, 259 so that the paramagnetic beads are dragged along the corresponding opposite relatively continuous and smooth wall without interference from the entrances of the supply channels 237, 239, 259. The wall along which these beads are dragged may include the ramp 213. Hence, at least one wall portion of the fluidic isolation chamber 209 and the output channel 211 extends parallel to and/or at obtuse angles with the linear direction F to avoid trapping and/or impeding the flow of fluids and particles, for example the at least one wall portion extending at the lateral side 261 opposite to the supply channels 237, 239, 259.

The fluidic isolation chamber 209 comprises a ramp 213 vertically under the output opening of the mixing chamber 207, at least in the illustrated upright use orientation. In one example, this may dampen the released mixed fluids that flow/fall out of the mixing chamber 207. The ramp 213 may inhibit, at least to sufficient extent, that certain amounts of fluids or particles other than the intended biological components enter the output channel 211. As previously discussed, each of volumes 207, 209, 211 may be at least partially surrounded by at least one partially converging wall that is parallel to and/or at obtuse angles with the linear direction F to avoid trapping and/or impeding the flow of fluids and particles. The higher density wash buffer may impede lysate to continue its path down the module 201 but other than that a relatively controlled and fluid stream of fluids and/or particles may be obtained between the input 203 and output 205 of the module 201.

At least one ambient air vent 257 may be directly connected to the fluidic isolation chamber 209, the air vent 257 adapted to facilitate air flow while impeding liquid flow between the fluidic isolation chamber and ambient air. In one example, this may facilitate the release of excess gas (bubbles) from the fluidic isolation chamber 209.

In the example of FIGS. 3 and 4, the module 201 comprises, from top to bottom, a series of sources 263, 225, 223, 265 that are to supply their contents to the output channel 211. Each source may comprise one of gas, dry or wet reagent, buffer and non-newtonian fluid. For example, the sources 263, 225, 223, 265 may extend along a lateral side 267 opposite to the lateral side 261 containing the ramp 213, and/or opposite to the lateral side 261 that is to extend adjacent an external magnetic force generator. In the example drawing, these sources may comprise, from top to bottom, air 263 or another gas, wash buffer 225, non-newtonian fluid 223, and buffer 265 and/or reagents for a master mix. The latter buffer 265 and/or reagents for a master mix may comprise lyophilized master mix reagent 269 to facilitate amplification and/or detection of nucleic acids and liquid reconstitution buffer 265 for the master mix reagent. In the illustrated example, the series of sources is provided, at least partially, by a blister pack 271 comprising multiple different separated sources of at least one of gas, reagent, buffer, and/or non-newtonian fluid, for example in a single blister pack strip or separate blister packs.

The blister pack or each blister pack may be adapted to be actuated to release its contents into the respective volume, for example via a corresponding supply channel. The blister pack may include breakable film for each of the sources, adapted to open and release the source contents in a corresponding supply channel, or directly into a volume, when external pressure is applied to the respective pack source. Each of the sources may be adapted to be actuated externally, for example by an external actuator of the host station that pushes against the respective pouch (e.g. blister pack source) such that the seal barrier opens, breaks, or ruptures. The source may comprise at least one actuatable barrier to, upon actuation, release the source contents into the respective volume through a supply channel. Note that, while the illustrated example sources are part of a blister pack, other source containers may be used that may at least partially consist of a film to seal and release the source content into the volumes, for example via supply channels.

The sources may be serially and linearly aligned over a single axis at one lateral side 267 of the module 201, the axis being parallel to the linear direction F. This may facilitate a relatively thin aspect ratio of the module 201 including the sources. In the illustrated example, the sources are provided at one lateral side 267 of the volumes, for example opposite to the ramp 213 and/or opposite to the lateral side 261 where the paramagnetic field is generated. Hence opposite to the connections of the sources/supply channels 237, 239, 257 the inner wall of the volumes 209, 211 may be generally smooth and/or void of separate entrances to facilitate fluid and particulate flow along that wall 261. In an example, the sources may be lined up in a different sequence than their respective entrances into the volumes by using separate supply channels 239, 237, 259. The supply channels may bridge the distance between a respective source and its volume entrance.

In an example, at least one supply channel 237, 239, 259 connects to at least one source of buffer and/or agent and/or air to the volumes 209, 211 at and/or downstream of a downstream portion 227 of the fluidic isolation chamber 209. In the illustrated example a plurality of supply channels 237, 239, 259 are connected to the output channel 211. The supply channels 237, 239, 259 comprise entrances to the respective volume 209, 211. In a further example, the supply channels 237, 239, 259 comprise elongate channels between the sources 223, 225 and the corresponding entrances (e.g., see FIG. 4). The supply channels may extend at least partially along walls, and externally of, the fluidic isolation chamber 209 and output channel 211, as well as through the volume walls into the respective volume. The supply channels 237, 239, 259 may comprise elongate slots and/or cutouts that extend in and along a wall surface 273 (see FIG. 4) at the lateral side 267 of the supply channels, which wall surface 273 extends approximately parallel to the linear direction F. The wall surface 273 may facilitate attaching the blister pack 271 of multiple blistered sources 263, 225, 223, 265, although in different examples other container types can be used to supply reagents, buffers and/or gases to the volumes 209, 211. A blistered source refers to a reservoir in a blister pack. A respective supply channel may comprise an entrance at its downstream end to supply the fluid and/or reagent into a respective volume 209, 211. The entrance extends through the volume wall, for example at an approximately straight angle with the linear direction F along which the volumes 207, 209, 211 are stacked. A film seal or the like, which in one example may be integral to the blister pack 271, may seal the sources 237, 239, 257 until they are opened to release the contents into the output channel 211 and/or fluidic isolation chamber 209 via the supply channels 237, 239, 259. For example, certain supply channels 259 may consist of a short entrance channel directly through the volume wall, to fluidically connect the adjacent source 223 directly to the adjacent volume 211, for example, void of a slot running in/along the wall surface 273. As illustrated, the entrances to the volumes 209, 211 of the supply channels may be lined up serially and/or linearly along an internal lateral side of the output channel 211. These entrances may connect the respective source fluids and/or reagents at a different sequence than the sequence of the sources. For example, while a wash buffer source 225 may be lined up above other sources, the corresponding supply channel entrance of the wash buffer source may be the lowest. The supply channels may provide for flexibility in lining up the different sources, for example according to their volume sizes or for other reasons like weight, density or sequence according to which they are to be opened. In certain other examples, a longer supply channel may allow for storing additional gas in the supply channel itself, to aid in mixing and/or pressurizing fluids in the output channel 211.

A source 225 of wash buffer may be fluidically connected to the fluidic isolation chamber 209 via the output channel 211. At release, the wash buffer may flow into the fluidic isolation chamber 209 through the output channel 211, for example in the downstream portion 227 of the fluidic isolation chamber 209. The wash buffer may receive the mixed components including the lysate after opening the upstream valve 219 from the mixing chamber 207. The wash buffer may prevent that too much lysate reaches the output channel 211, by having a relatively high density. The lower density lysate may remain on top. The wash buffer in the source 225 may have a higher density than at least one and/or a combination of the biological sample and lysate. The wash buffer may have a higher density than the binding buffer. For example, the wash buffer has a density of at least approximately 1.05 g/ml or at least 1.15 g/ml. In certain examples the lysate and/or binding buffer has a density of approximately 1 g/ml or less or approximately 0.95 g/ml or less. The ramp 213 in the fluidic isolation chamber 209 that is provided at a lateral side 261 below the mixing chamber output and valve 219, in a use (e.g., upright) orientation of the module 201, may inhibit that mixed fluids such as lysate enter the output channel 211. The ramp 213 may also be used as a surface along which the particulate substrate may be dragged or moved along a desired path by the external magnetic forces.

A wash buffer supply channel 237 may be provided along a wall of the fluidic isolation chamber 209 and/or the output channel 211, opening into the output channel 211 to supply the wash buffer via the supply channel 237 to a downstream portion 227 of the fluidic isolation chamber 209. The wash buffer will fill the output channel 211 and fluidic isolation chamber 209 up to a certain point to receive the mixed fluids and particle substrate from the mixing chamber 207. The supply channel 237 of the wash buffer may be elongated, that is, relatively long. The volume of the wash buffer may be larger than the other sources. The supply channel 237 of the wash buffer may open into the output channel 211 at a relatively low, downstream point, for example lower than other supply channel entrances. For example, the wash buffer supply channel is connected to the output channel 211 downstream of the reagent supply channel and/or non-newtonian fluid supply channel. The wash buffer source 225, as well as other sources, may release their content into the supply respective channel(s) by depressing the source. For example a puncture element may be provided in the wall to which the sources are provided to assist in puncturing/tearing the source.

The module 201 comprises a source 223 of non-newtonian fluid, such as grease. The source 223 of non-newtonian fluid is connected to the output channel 211 to supply the non-newtonian fluid to the output channel 211, for example, to create a non-newtonian fluid plug in the output channel 211. The source 223 of non-newtonian fluid may be connected to the output channel 211 via non-newtonian fluid supply channel 259, in this example short entrance channel directly through the wall between the source 223 and output channel. The entrance opening of the non-newtonian fluid supply channel 259 may open into the output channel 211 at a higher point than one or all of the other supply channels 237, 239, for example upstream of a reagent supply channel and/or the wash buffer supply channel. The non-newtonian fluid is adapted to, upon actuation of the source 223 for releasing its contents, form a plug in the output channel 211 to inhibit fluids upstream of the plug (e.g., lysate) to mix with fluids and components (e.g., biological components, particulate substrate) downstream of the plug. In this example, once the plug is inserted, the fluid downstream of the plug contains higher amounts of biological components than the fluid upstream of the plug. The fluid under the plug may also contain higher amounts of particulate substrate than above the plug, or substantially all the particulate substrate in the module 201, as controlled by the external paramagnetic field, in a use orientation of the module 201.

For example, a capillarity of the output channel 211, in conjunction with the characteristics of the non-newtonian fluid, are such that the plug of the non-newtonian fluid in the output channel 211 can withstand a pressure exerted by the fluid upstream of the plug of at least 500 Pa, or at least 1000 Pa, or at least 2000 Pa.

Instead of a plug of non-newtonian fluid, plug types of other materials may be used. Also, a mechanical valve can be used to separate upstream from downstream fluids, for example, to protect downstream biological component from upstream lysate.

Gas such as air may be provided in or along one of the supply channels 239, which gas may be pushed out when another source, such as a reconstitution buffer source 265, is actuated. The gas may enter the output channel 211 to provide for a gas bubble in the output channel 211. The gas bubble may separate fluids similar to a plug or gas explained above, for example, to provide for some initial separate of fluids before the non-newtonian fluid plug is supplied to an upstream portion of the output channel 211. In one example, the gas is supplied before the non-newtonian fluid to clear the way for the non-newtonian fluid, as well as provide for initial separation of upstream fluids and downstream biological component. Then the non-newtonian fluid plug may be inserted to seal downstream fluid operations from the upstream fluids.

Instead of, or in addition to, the non-newtonian fluid source 223 and gas, an additional source 263 of gas may be provided that is to supply gas to the output channel 211, for example, to aid in dispensing fluids below the non-newtonian fluid plug (or other valve) once the isolation process has been sufficiently completed, and after the output seal valve 249 is opened. Hence, in one example, the sources and/or supply channels include two separate sources of gas that may exert different functions.

At least one source may be connected to an internal pressure source, or connectable to an external (host station) pressure source, to provide additional pressure to move the source contents towards the volume. For example, a pressure source is connected to the wash buffer source to stimulate the release of wash buffer into the fluidic isolation chamber.

In certain examples the mere actuation (e.g., pushing) of the source for releasing the contents may provide for sufficient pressure. Also, where air or another gas is provided inside a source or supply channel, this may mean that, when compressing a corresponding source for actuation, the gas may provide pressure to push other source contents towards the volumes. In another example, a source or supply channel of the module 201 may comprise a pre-compressed gas to pressurize a fluidically connected source upon actuation of the source.

The output channel 211 includes an upstream entrance 231 that interfaces with the fluidic isolation chamber 209. The output channel 211 includes the downstream output 205. The output channel 211 is of narrower average diameter than the fluidic isolation 209 and mixing chamber 207. The output channel 211 may be, or at least function as, a capillary needle. The output channel 211 may have a cross sectional inner diameter small enough to exert capillary action onto fluids inside the channel 211, to retain these fluids. The module 201 may be adapted to dispense fluids out through the output 205. As explained, a gas such as air may be released into the output channel 211 for dispensing the isolated biological components, after the purification.

In the example illustrated in FIGS. 3 and 4, the cartridge module 201 includes a liquid tight output seal valve 249 sealing the output channel 211. The seal valve 249 is to be actuated to open the output 205. For example, the seal valve 249 comprises a cap of elastomer properties to seal the output tip at the downstream end of the capillary output channel 211. The seal valve 249 is adapted to seal the volumes 209, 211 during the mixing and purification process. The seal valve 249 is adapted to be opened with respect to the output 205 to dispense purified biological components or other processed fluids from the output 205. In one example, the seal valve 249 is adapted to reseal again after dispensing sufficient biological components. The seal valve 249 may be septum seal of a cylindrical cap or lid shape to seal the output 205. The seal valve 249 may be biased with respect to the output 205, to be opened against the bias force upon actuation. The seal valve 249 may be biased to reseal again upon release of the seal valve 249. For example a spring 275 may be mounted around the output channel 211 to bias the output valve 249 with respect to the output 205. The spring 275 may be mounted against the housing of the module 201. The output 205 may be opened by piercing the seal valve 249, when the module 201 and/or seal valve 249 are actuated. In one example, after processing, the whole module 201 is moved downwards against the bias force whereby the seal valve 249 retained by the host station, and the seal is ruptured. In another example the seal valve 249 can be moved against the bias force and the module 201 may be retained, to open the seal. In the illustrated example of FIG. 3 the seal valve 249 may move upwards relative to the output channel 211 and/or the output channel 211 may move downwards relative to the seal valve 249, in order to open the output 205 for dispensing. Once the seal valve 249 and rest of the module 201 are released with respect to each other, the bias force may again close the output 205. A slit opening, as caused by the rupturing, may close again to reseal the output 205. The seal valve 249 may include elastomer material configured to self-close the break seal.

The module 201 may comprise at least one source 265 containing a reagent. The reagent is to be supplied to the output channel 211, for the module 201 to dispense the isolated biological components with that reagent from the output 205. The reagent comprises at least one of a lyophilized reagent 269 and a reconstitution buffer for the reagent 269. The reconstituted reagent may provide for a master mix for the purified biological components. In the illustrated example, the reconstitution buffer is provided in the lower source 265. The source 265 can be connected to the corresponding reagent supply channel 239 that opens into the output channel 211. In the illustrated example the source 265 of reagent and/or reconstitution buffer may be a lowest source of a linearly aligned series of sources 265, 223, 225, 263.

In certain examples master mix components need not be provided. For example, master mix may be provided in a separate receptacle to receive the dispensed isolated particulate substrate and biological component.

In one example, a gas may be connected to the source 265 of buffer and/or reagent. The gas may be provided in a supply channel 239 connected to the source 265 of buffer and/or reagent. The gas may be air. Upon actuating a reconstitution/reagent buffer source 265, gas inside the corresponding supply channel 239 may be pushed into the output channel 211. For example, the released gas is to at least temporarily provide for a gas barrier in the output channel 211 between fluids upstream and downstream of the gas.

Another source 263 of gas can be connected to the reagent supply channel 239, for example to pressurize downstream fluids for dispensing. That gas is to be expelled into the output channel 211 upon actuating the source 263. For example, upon actuating the source 263, the released gas pressurizes the mix including a master mix reagent, particulate substrate and the biological component. The pressure that is applied to the downstream fluids by supplying the gas may facilitate expelling the particulate substrate. The gas may also, to some extent, facilitate mixing with the supplied master mix.

It is noted that at least one of the supply channels 237, 239, 259 can be connected to one of the volumes 207, 209 above the output channel 211 to release the contents in the volumes 207, 209 above the output channel 211. For example, the released fluids may flow downstream as a result of gravity or by (gas) pressure.

Figure 5:
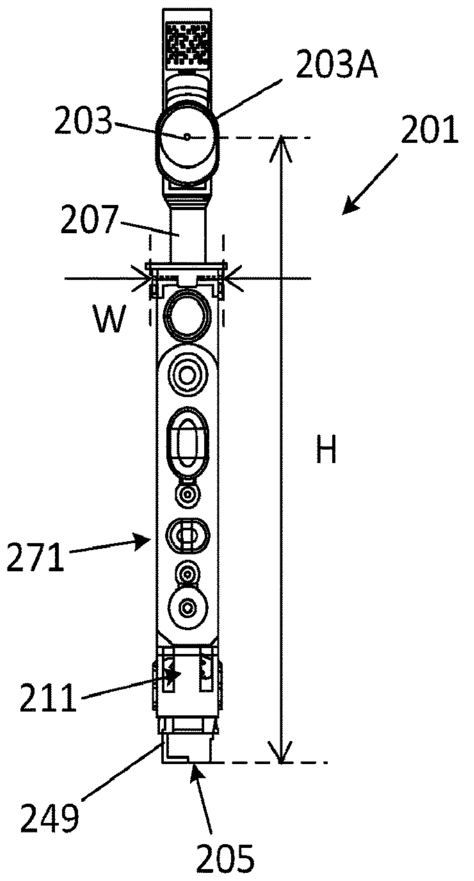
FIG. 5 illustrates an example of a sample preparation cartridge module in a front view.

Each module 201 may be of relatively narrow aspect ratio. For example, turning to an example module 201 illustrated in FIG. 5, a maximum height H of the module can be at least three times or at least five times a maximum width W (and depth) of the module 201, whereby a height H may extend between the top of the mixing chamber 207 and the downstream output tip 205 of the output channel 211. In one example the height may be measured between a center of the input channel 203A and a downstream end of the output 205, whereby in this example the output seal valve 249 and pressure source/mixer actuator are not taken into account. The maximum width W of the module 201 is a largest external diameter or width, for example including the series of sources 271. In one example a maximum width of the module 201 is 20 mm or less, for example 18 mm or less, for example approximately 17 mm or less. In another example a maximum height H of the volume, between a top of the mixing chamber 207 and/or pressure source 245 and a lowest point of the output seal valve 249, is approximately 200 mm or less, 160 mm or less, or approximately 150 mm or less or approximately 135 mm or less. In another example a TH total external height TH of the module 201 between the upper external end (e.g. actuator 245 or actuator housing) and the lower output seal valve end may be approximately 200 mm or less, approximately 170 mm or less or approximately 153 mm or less.

Figure 6:
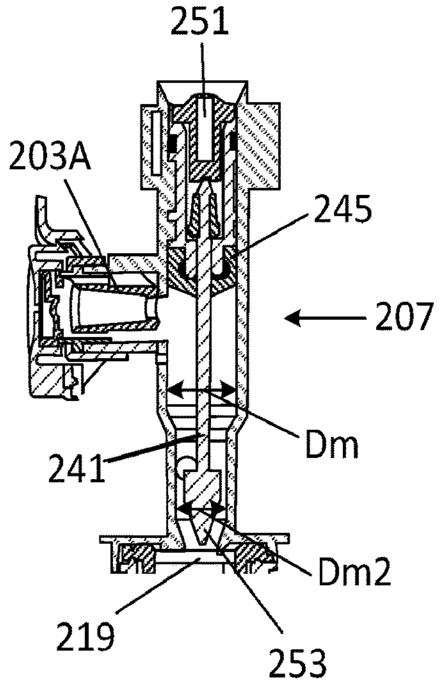
FIG. 6 illustrates an example of a cross section of a mixing chamber.
Figure 7:
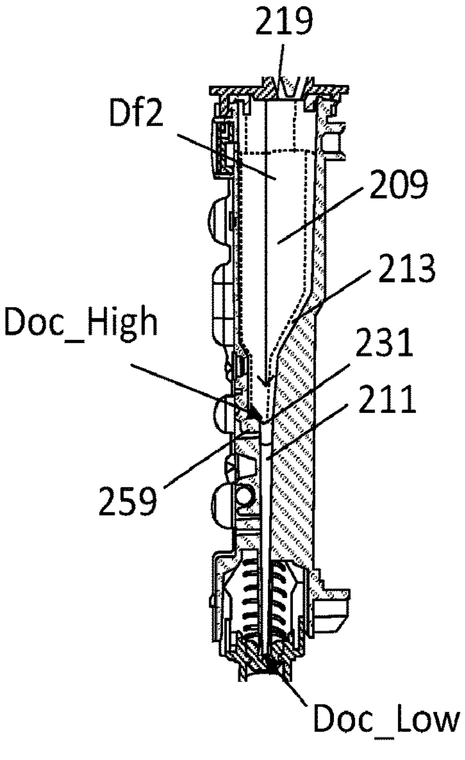
FIG. 7 illustrates an example of a cross section of a fluidic isolation chamber and an output channel.

FIGS. 6 and 7 can be referred to for example dimensions of the module's volumes 207, 209. The module 201 may have a narrow form factor, wherein the mixing chamber 207, fluidic isolation chamber 209 and output channel 211 have a total height being at least three times, or at least five times a maximum cross sectional width of the widest volume. Turning to the example of FIG. 6, a cross sectional internal diameter Dm of the mixing chamber 207, just downstream and below of the input channel 203A, can be approximately 12 mm or less, approximately 10 mm or less, or approximately 8.6 mm or less. The mixing volume can be, but need not be, cylindrical. A further downstream portion of the mixing chamber 207 may have a smaller diameter Dm2, for example approximately 10 mm or less, 8 mm or less or approximately 6.6 mm or less. A mixing volume of the mixing chamber 207, between the output valve 219 and the top of the mixing volume of the chamber 207, here determined by a bottom of a piston of the pressure source 245, may be approximately 20 ml or less, approximately 15 mm or less, or approximately 12 ml or less. In this example, the input channel 203A is not included in the mixing volume of the mixing chamber 207, for calculating the width W. In another example, the input channel 203A can be part of the mixing volume of the mixing chamber 207. A piston of the pressure source 245 may be of complimentary shape of the upstream mixing chamber portion while a paddle of the mixer 241 and/or actuator 253 may be of complimentary shape of the downstream mixing chamber portion.

Turning to the example of FIG. 7, the fluidic isolation chamber 209 may have a first maximum internal diameter of approximately 18 mm or less, approximately 15 mm or less, or approximately 13 mm or less. The fluidic isolation chamber 209 may have said first approximate maximum internal diameter in a first direction. The fluidic isolation chamber 209 need not be cylindrical. In fact, in the illustrated example, the volume of the chamber 209 has a different maximum diameter in different directions at straight angles with each other. The inner volume of the fluidic isolation chamber 209 may have a different depth and a different width. The first diameter may be considered the width and a second diameter Df2 may be considered the depth, whereby the first diameter may determine a total width W of the module 201, which in turn may determine a pitch of multiple of said modules 201 lined up in series horizontally (see FIGS. 8 and 9). The fluidic isolation chamber 209 may further have a second maximum internal diameter Df2 in a second direction at straight angles with the first direction. The second maximum internal diameter Df2 may be approximately 10 mm or less, approximately 8 mm or less or approximately 6.3 mm or less. The maximum internal diameters may be measured near the top, i.e., in an upstream portion above the ramp 213, of the fluidic isolation chamber 209, below the mixing chamber output valve 219. In FIG. 7, said first direction extends straight into the page referring to FIG. 7, which is horizontally in FIG. 6.

In an example, the output channel 211 provides for capillary action and comprises a needle chamber. Before usage, the output channel 211 need not be separated from the fluidic isolation chamber 209 by a valve. As illustrated, the fluidic isolation chamber 209 and output channel 211 may provide for a converging yet continuous volume. The total inner volume of the output channel 211 may be relatively small as compared to the total volume of the fluidic isolation chamber 209, for example approximately 10% or less, or approximately 5% or less, or approximately 2% or less of the total accumulated volume of the chamber 209 and channel 211. A total volume of the fluidic isolation chamber 209 and output channel 211 may be approximately 40 ml or less, approximately 30 ml or less, or approximately 21 ml or less.

The output channel 211 may start downstream of the fluidic isolation chamber 209, at the entrance 231 of the output channel 211, where capillary action is exerted upon liquids entering the channel 211, for example just above a highest source entrance and/or supply channel 259 opening into the output channel 11 just at the top of the output channel. That supply channel 259 may connect to a fluid plug source 223 such as a non-newtonian fluid. A largest internal diameter Doc_High of the output channel 211 may be at the top, adjacent to the fluidic isolation chamber 209, and may be approximately 3 mm or less, or approximately 2.5 mm or less, or approximately 2.32 mm or less. A smallest internal diameter Doc_Low may be at or near the output 205. The smallest internal diameter Doc_Low is smaller than the largest internal diameter Doc_High. For example, the smallest internal diameter Doc_Low is approximately 1.5 mm or less, approximately 1 mm or less, approximately 0.86 mm or less, or approximately 0.5 mm or less. In one example, a smallest internal diameter Doc_Low can be right at the output opening, for example approximately 0.5 mm, as measured in extreme downstream output end.

Figure 8:
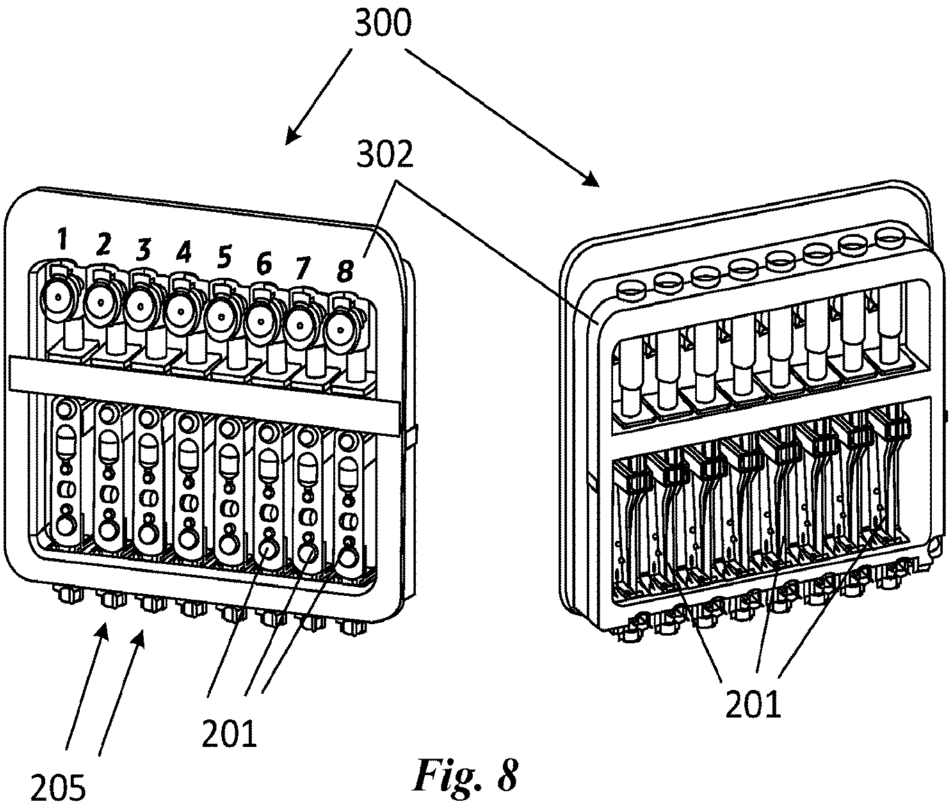
FIG. 8 illustrates two different perspective views of an example sample preparation cartridge with a plurality of modules.

The examples of FIG. 8, illustrating two cartridges 300 in different positions, illustrate how the relatively thin aspect ratio module 201 allows for a plurality of modules 201 to be held at a relatively small regular pitch of, for example, approximately 20 mm or less, or approximately 18 mm or less. The pitch may be such that the outputs 205 are aligned to a receptacle cell array, for example per standards or norms in biological sample testing industry. As illustrated in FIG. 8, a cartridge 300 can be provided that comprises a plurality of modules 201 held in series at a regular pitch, for example eight modules 201. The cartridge 300 may comprise a frame 302. The plurality of separate modules 201 may be held by the frame 302 at the regular pitch. The frame 302 may be adapted to receive and support the modules 201. The frame 302 may be adapted to engage and position itself with respect to a host station, for installing the plurality of modules 201 as a single unit in the host station, and for aligning these modules 201 with respect to a biological component receiving receptacle and host station components. Host station components that the frame 302 aligns to may include a magnetic force generator, a blister pack opener, tools that engage the pressure source/mixer actuator 251, and other components.

In another example, a separate frame need not be provided. A plurality of modules 201 may be directly attached to each other as a single cartridge, for example using male and female connector elements or the like, at the regular pitch, which could also facilitate installing the plurality of modules 201 into a host station as a single unit. In again other examples, a single module 201 may be a cartridge as a singular unit to be connected to a host station as singular unit.

An example process of purifying or isolating biological components such as nucleic acids from a biological sample, using one of the example modules 1, 101, 201 of this disclosure, can be as follows.

At a start of the process, an input valve 247 of the module 201 may be opened and a biological sample in binding buffer, for example approximately 50 to 1000 uL of buffer, is inserted into the mixing chamber 207 through the input 203. The input valve 247 is closed. The buffer reconstitutes lyophilized pellet(s) 243 of reagent components pre-stored in mixing chamber 207. Paramagnetic beads may be included in the lyophilized pellet(s) 243. The mixer 241 is rotated to nix the fluid and disperse the particles including the paramagnetic beads. In another example mixing could be achieved by vibration. Heat and/or cooling may be applied to the mixing chamber 207 in accordance with a desired temperature profile. The angular velocity of the mixer may be modulated to create a desired profile for mixing. Lysing of organisms can be improved with elevated temperature and/or through certain chemical means not discussed here. The binding of nucleic acids to the paramagnetic beads may be performed in a desired temperature range and predetermined chemical environment.

The wash buffer may be loaded downstream of the fluidic isolation chamber 209, for example first into the output channel 209, by opening and depressing a wash buffer blister 225. Then, a film valve 219 sealing the mixing chamber 207 may be punctured by depressing the mixer 241 to pierce the film valve 219. The plunger of the pressure source 245 may be pressed, at the same time as said puncturing or afterwards, to dispense lysate out of mixing chamber 207 and onto the wash buffer in the fluidic isolation chamber 209. In this example, the wash buffer has a larger specific gravity (e.g., density or weight per volume unit) than the lysate, so mixing of lysate with wash buffer is limited and they stay sufficiently separated after dispense for the duration of the assay, de facto providing for a density gradient of the two different density liquids.

With at least one magnetic force generator of a host station, which may include one or more permanent magnets or electrical magnetic force generators, the paramagnetic beads in the lysate are gathered together. Through the magnetic force the paramagnetic beads, associated with the nucleic acids during said mixing, are transported down to the bottom of the wash buffer layer in the capillary output channel 211. The beads may be dragged along the interior wall surface and/or swept side to side and/or swept back and forth with the motion of the one or more magnetic force generators (e.g. magnets). In these examples the movement of the particulate substrate and the biological component may deviates from a linear direction, for example, to promote purification, as induced by the magnetic force generator(s). Still, the volumes may be linearly stacked and their walls may be adapted to avoid trapping of particles or fluids, facilitating movement or the particulate substrate along the linear direction.

Figure 9:
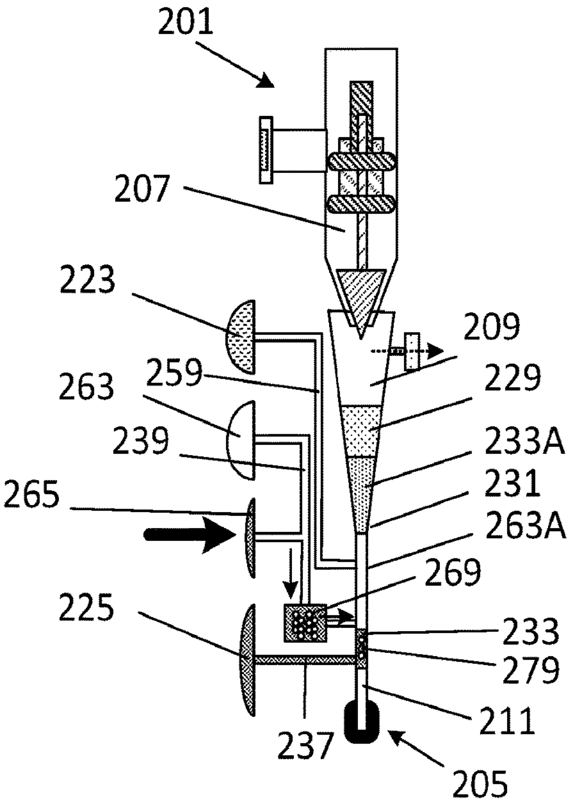
FIG. 9 illustrates a diagram of an example module in a first state during a purification process.
Figure 10:
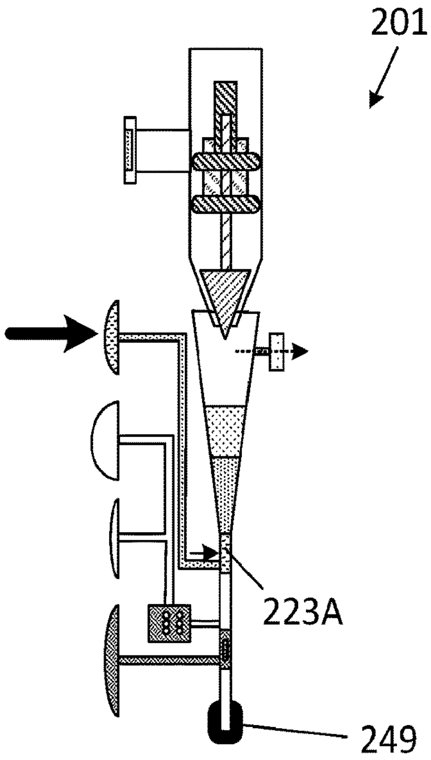
FIG. 10 illustrates a diagram of an example module in a second state during a purification process.

Continuing this example process, FIGS. 9 and 10 illustrate diagrams representing respective subsequent states of example modules 201. Similar reference numbers as previous FIGS. 3-8 have been used to represent different example features of the module 201.

At least one reconstituted lyophilized pellet 269 of reagent (e.g., master mix for nucleic acid amplification and detection) is released into the output channel 211 by depressing a blister 265 of reconstitution buffer. In one example, the act of opening and/or displacing the buffer will push air 263A that was present in the lyophilized pellet chamber and supply channel 239, into the capillary output channel 211. Air in the output channel 211 is indicated by reference number 263A. The air 263A pushed into the output channel 211 may segregate the wash buffer into two separate volumes, whereby a relatively small volume of wash buffer 233 downstream in the output channel 211, near the output 205, continues to contain the paramagnetic beads 279 and associated nucleic acids. The rest of the wash buffer 233A may reside mostly upstream in the fluidic isolation chamber 209 above, separated from the paramagnetic beads 279 by the air 263A. Hence, this air 263A may form an air bubble plug inside the capillary output channel 211. It is noted that some excess air may rise up through the upstream fluids 229, 233A and be vented out of the fluidic isolation chamber 209 using the air vent 257. The upstream fluids 229, 223A may comprise lysate 229 and wash buffer 233A with relatively low amounts of beads and/or nucleic acids as compared to the downstream wash buffer 233 or in some scenarios no beads nor nucleic acids if all nucleic acids are trapped at the output 205.

The non-newtonian fluid 223A may be supplied to the output channel 211, for example through a corresponding supply channel 259 connected near the upstream entrance 231 of the output channel 211 (FIG. 10). The non-newtonian fluid source 223 may be actuated by pressing the corresponding blister. The hence formed plug 223A separates the fluids 229, 233A, upstream in the fluidic isolation chamber 209, from downstream fluid operations. The non-Newtonian fluid plug 223A, can support some pressure without flowing, as explained above, which may be determined by its yield stress property and the geometry of the capillary output channel 211 and the fluidic isolation chamber 209.

The output seal valve 249 may be opened for dispensing the downstream wash buffer 233 with (or without) beads 279 and nucleic acids. The output seal valve 249 may be opened by piercing and moving the valve 249 up with respect to the output channel shaft. In one example, this is actuated by pushing the valve 249 against a receptacle whereby the valve 249 is pierced through by the output channel output 205.

In another example process using an example module of this disclosure, at or before dispensing, heating is applied to the output channel 211 to release at least some biological component from the particulate substrate, and magnetic force is applied to retain the particulate substrate, so that the isolated biological component may be dispensed from the output 205 into a receptacle without, or with less, particulate substrate.

In one example, the nucleic acids (with or without beads and Master Mix reagent) may be dispensed by depressing the air blister 263 whereby further air is pushed into the channel 211, through a supply channel 239 that connects to the output channel 211 at or under (the output channel 259 of) the non-newtonian fluid plug 223K In this example, air is pressurized and displaces the reconstituted Master Mix including the nucleic acids into and down the channel capillary, and out of the output tip into a receptacle. The non-newtonian fluid plug 223A above may prevent flow upwards, at least to sufficient extent. The output 205 can be resealed by the same output valve 249 to prevent fluids in the cartridge from exiting after the initial dispensing. The valve 249 can be transported back down with respect to the output channel shaft using a biased spring, upon releasing the valve 249 from the receptacle, to again seal the output tip.

As explained previously, particulate substrate can include magnetizing microparticles, also referred to as (para)magnetic beads. The magnetizing microparticles may be provided in at least one lyophilized pellet in (or connected to) the mixing chamber. The magnetizing microparticles can be in the form of paramagnetic microparticles, superparamagnetic microparticles, diamagnetic microparticles, or a combination thereof, for example. In some examples, the magnetizing microparticles are paramagnetic microparticles. In some examples, the particulate substrates are magnetic beads. The term “magnetizing microparticles” or “magnetic bead” is defined herein to include microparticles that may not be magnetic in nature unless and until a magnetic field is introduced at a strength and proximity to cause them to become magnetic. Their magnetic strength can be dependent on the magnetic field applied and may get stronger as the magnetic field is increased, or the magnetizing microparticles get closer to a magnet applying the magnetic field. In more specific detail, "paramagnetic microparticles" have these properties, in that they have the ability to increase in magnetism when a magnetic field is present; however, paramagnetic microparticles are not necessarily magnetic when a magnetic field is not present. In some examples, the paramagnetic microparticles can exhibit no residual magnetism once the magnetic field is removed. A strength of magnetism of the paramagnetic microparticles can depend on the strength of the magnetic field, the distance between a source of the magnetic field and the paramagnetic microparticles, and a size of the paramagnetic microparticles. As a strength of the magnetic field increases and/or a size of the paramagnetic microparticles increases, the strength of the magnetism of the paramagnetic microparticles increases. As a distance between a source of the magnetic field and the paramagnetic microparticles increases, the strength of the magnetism of the paramagnetic microparticles decreases. "Superparamagnetic microparticles" can act similar to paramagnetic microparticles; however, they can exhibit magnetic susceptibility to a greater extent than paramagnetic microparticles in that the time it takes for them to become magnetized appears to be near zero seconds. "Diamagnetic microparticles," on the other hand, can display magnetism due to a change in the orbital motion of electrons in the presence of a magnetic field.

The magnetizing microparticles can be surface-activated to selectively bind with a biological component or can be bound to a biological component from a biological sample. An exterior of the magnetizing microparticles can be surface-activated with interactive surface groups that can interact with a biological component of a biological sample or may include a covalently attached ligand. In some examples, the ligand can include proteins, antibodies, antigens, nucleic acid primers, nucleic acid probes, amino groups, carboxyl groups, epoxy groups, tosyl groups, sulphydryl groups, or the like. In one example, the ligand can be a nucleic acid probe. The ligand can be selected to correspond with and to bind with the biological component. The ligand may vary based on the type of biological component targeted for isolation from the biological sample. For example, the ligand can include a nucleic acid probe when isolating a biological component that includes a nucleic acid sequence. In another example, the ligand can include an antibody when isolating a biological component that includes antigen. In one example, the magnetizing microparticles can be surface-activated to bind to nucleic acids. Thus nucleic acid molecules (DNA or RNA) can be bound to the surface of the magnetizing microparticles. Commercially available examples of magnetizing microparticles that are surface-activated include those sold under the trade name DYNABEADS®, available from ThermoFischer Scientific (USA). In some examples, the magnetizing microparticles can have an average particle size that can range from 10 nm to 50,000 nm. In yet other examples, the magnetizing microparticles can have an average particle size that can range from 500 nm to 25,000 nm, from 10 nm to 1,000 nm, from 25,000 nm to 50,000 nm, or from 10 nm to 5,000 nm. The term "average particle size" describes a diameter or average diameter, which may vary, depending upon the morphology of the individual particle. A shape of the magnetizing microparticles can be spherical, irregular spherical, rounded, semi-rounded, discoidal, angular, sub-angular, cubic, cylindrical, or any combination thereof. In one example, the particles can include spherical particles, irregular spherical particles, or rounded particles. The shape of the magnetizing microparticles can be spherical and uniform, which can be defined herein as spherical or near-spherical, e.g., having a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter (e.g., the average of multiple dimensions across the particle) or by an effective diameter, e.g., the diameter of a sphere with the same mass and density as the non-spherical particle.

The module 1, 101, 201 could be used for isolating any biological component from a biological sample using a particulate substrate, not necessarily nucleic acids and/or not necessarily using magnetizing particles.

Certain examples explained in this disclosure allow for purifying and/or isolating biological components from a biological sample at relatively high speed such as approximately 20 minutes or less, or approximately 15 minutes or less, on average, whereby the process includes inserting and mixing the biological sample and dispensing the purified biological components. The biological components may be dispensed in a master mix.

In other example modules one or more pressure sources may be connected to at least one of the sources of buffers, reagents and air, to help expel the respective source contents into the respective volume. The pressure source could be part of the module, such as a compressed gas.

In one example, a single monolithically molded structure defines the fluidic isolation chamber 209 and the output channel 211. In a further example, a second single monolithically molded structure defines the mixing chamber 207. The second single monolithically molded structure may be connected to the first single monolithically molded structure, for example by snap fit and with a separate seal in between and/or by heat staking or welding.

In an example, the mixing chamber 207 and/or fluidic isolation chamber 209 are void of supply channels 237, 239, 259, whereby all supply channels 237, 239, 259 connect to the output channel 211.

In this disclosure, valves may comprise a breakable, openable or removable separation, barrier or seal between volumes to establish flow of fluids and/or particles between the volumes, or, in case of the output, to facilitate dispensing. Example valves may comprise rupturable seal films heat staked to the plastic structures, for example for the blister pack sources and/or the mixing chamber output valve. Other valves may comprise openable and resealable cap, tip and/or lid structures, such as for the input and output of the module.

It is noted while a density gradient, as discussed in this disclosure, could appear to imply discretely stacked fluid layers of different densities, in reality, some amount of local mixing of the post-mixing lysate and wash buffer may occur, or in fact, can be expected. The interface between the different fluids may even continue to mix over time, however, at a slow enough rate to not impede the purification process.

Certain example modules of this disclosure facilitate process modules of relatively small volumetric dimensions and of relatively thin aspect ratios. Relatively cheap materials may be used for the modules to be disposed after usage. This may enable usage of the modules and its host station, not only in laboratories, but potentially also in other non-laboratory or not-specialized environments. In a further example, the modules may reduce the costs of the isolation process. The modules may facilitate a relatively fast isolation process.

While the present technology has been described with reference to certain examples, various modifications, changes, omissions, and substitutions can be made.

The below clauses define different examples of this disclosure that relate to, and/or may be combined with, different example features disclosed already above. Further example modules of this disclosure may be derived from any, or any combination, of the following clauses, whereby each clause may be combined with, or defined by, any, or any combination, of example features disclosed above.

Clauses

1. A sample preparation cartridge module comprising
a biological sample input and an output;
interconnected volumes arranged in series between said input and output, along a linear direction, the volumes comprising
a fluidic isolation chamber connected to the input downstream of the input to separate particulate substrate and a biological component from the biological sample, and
an output channel connected to the fluidic isolation chamber downstream of the fluidic isolation chamber and leading to the output
whereby the module for example comprise a mixing chamber connected to the biological sample input, to contain and mix a composition comprising a biological sample and a particulate substrate, the biological sample including a biological component, to provide mixed composition to a connected downstream fluid isolation chamber.

2. The cartridge module of any preceding clause or example wherein the particulate substrate is configured to be associated with the biological component, to isolate the biological component from the biological sample.

3. The cartridge module of any preceding clause or example wherein the particulate substrate comprises magnetic beads and the biological component comprises nucleic acids.

4. The cartridge module of any preceding clause or example comprising at least one supply channel connected to the volumes, for example (but not necessarily) at and/or downstream of a downstream portion of the fluidic isolation chamber to release at least one buffer and/or reagent at and/or downstream of the downstream portion of the fluidic isolation chamber.

5. The cartridge module of any preceding clause or example wherein a plurality of supply channels and/or sources, separate from the mixing chamber and fluidic isolation chamber, is connected to the output channel.

6. The cartridge module of any preceding clause or example comprising at least one source the contents of which comprises at least one of buffers, reagents, lyophilized reagents, non-newtonian fluid and/or gas, the at least one source connected to, or provided in, the volumes.

7. The cartridge module of any preceding clause or example wherein the at least one source comprises a breakable seal to open upon actuation, the source being fluidically connected to the output channel through a corresponding supply channel when the seal is open.

8. The cartridge module of any preceding clause or example wherein the volumes are stacked along the linear direction and arranged to, during use, directly communicate, without separate longitudinal fluid channels in between.

9. The cartridge module of any preceding clause or example comprising a valve between the mixing chamber and fluidic isolation chamber to release mixed composition into the fluidic isolation chamber.

10. The cartridge module of any preceding clause or example adapted to have a use orientation whereby the linear direction is approximately parallel to the direction of gravity.

11. The cartridge module of any preceding clause or example wherein the volumes at least one partially converging wall that is parallel to and/or at obtuse angles with the linear direction to avoid trapping and/or impeding the flow of fluids and particles.

12. The cartridge module of any preceding clause or example wherein the fluidic isolation chamber converges in the linear direction to transition into the output channel, the fluidic isolation chamber and output channel providing for a continuous volume.

13. The cartridge module of any preceding clause or example wherein the output channel comprises a capillary channel that provides for capillary action.

14. The cartridge module of any preceding clause or example wherein the fluidic isolation chamber comprises a ramp provided at a lateral side in at least a downstream portion of the fluidic isolation chamber, the ramp extending, in a use and/or upright orientation of the module, right under an output of the mixing chamber to the fluidic isolation chamber, so that fluids and particulate substrate are released from the mixing chamber above the ramp rather than above an entrance to the output channel.

15. The cartridge module of any preceding clause or example wherein a downstream portion of the mixing chamber that is connected with the fluidic isolation chamber converges.

16. The cartridge module of any preceding clause or example comprising a source of wash buffer connected to the fluidic isolation chamber to supply the wash buffer to a downstream portion of the fluidic isolation chamber, so that a mixed composition in the mixing chamber is released from the mixing chamber on top of the wash buffer.

17. The cartridge module of any preceding clause or example comprising
a wash buffer supply channel connected to the wash buffer source and to the output channel, to supply the wash buffer to a downstream portion of the fluidic isolation chamber, and
an openable seal between the output channel and the source.

18. The cartridge module of any preceding clause or example wherein the wash buffer has a higher density than lysate and/or has a density of at least approximately 1.05 g/ml or at least approximately 1.15 g/ml.

19. The cartridge module of any preceding clause or example comprising at least one source containing reagent, the reagent to be supplied to the output channel, for the cartridge module to dispense the isolated biological components with the reagent from the output.

20. The cartridge module of any preceding clause or example wherein the reagent comprises at least one of a lyophilized reagent and a reconstitution buffer, and the source is connected to a supply channel connected to the output channel.

21. The cartridge module of any preceding clause or example wherein the at least one source of reagent, and/or a supply channel connected to the source of reagent and the output channel, comprises gas that is to be expelled into the output channel upon actuating the source to provide for a gas bubble plug in the output channel.

23. The cartridge module of any preceding clause or example comprising a source of gas to supply the gas to the output channel, to, upon actuation, pressurize fluids in a downstream portion of the output channel for dispensing.

24. The cartridge module of any preceding clause or example comprising a source of non-newtonian fluid connected to the output channel to, upon actuation, form a plug in the output channel to inhibit fluids upstream of the plug to mix with fluids and components downstream of the plug.

25. The cartridge module of any preceding clause or example wherein a capillarity of the output channel is such that a plug of the non-newtonian fluid in the output channel can withstand a pressure exerted by the fluid upstream of the plug of at least 500 Pa, or at least 1000 Pa, or at least 2000 Pa.

26. The cartridge module of any preceding clause or example comprising another supply channel to supply wash buffer and/or another supply channel to supply reagent, wherein the supply channel connected to the non-newtonian fluid source is connected to the volumes upstream of the at least one other supply channel.

27. The cartridge module of any preceding clause or example comprising another supply channel to supply non-newtonian fluid and/or another supply channel to supply reagent wherein the wash buffer supply channel is connected to the output channel downstream of the at least one other supply channel.

28. The cartridge module of any preceding clause or example comprising at least one supply channel connected to the volumes, at least one source connected to at least one corresponding supply channel, or each source containing one of a wet reagent, dry reagent, gas, buffer fluid and non-newtonian fluid, and at least one corresponding actuatable barrier to, upon actuation, release the source contents into the respective volume through the supply channel.

29. The cartridge module of any preceding clause or example comprising a linearly arranged series of blistered sources along one lateral side of the volumes, each blistered source adapted to be actuated to release its contents into one of the volumes.

30. The cartridge module of any preceding clause or example comprising at least one blister pack, wherein the blister pack or each blister pack may include breakable film for each of the sources, adapted to open and release the source contents in a corresponding supply channel, or directly into a corresponding volume, when external pressure is applied to the respective blister pack.

31. The cartridge module of any preceding clause or example comprising a plurality of sources and/or source supply channels connected to one of the volumes at one lateral side of the volumes.

32. The cartridge module of any preceding clause or example wherein the fluidic isolation chamber comprises a ramp at one lateral side, the ramp extends across at least a downstream portion of the fluidic isolation chamber, to, on the one hand, receive mixed composition below an output of the mixing chamber in an upright orientation of the cartridge module, and, on the other hand, facilitate the transition of the fluidic isolation chamber into the output channel to guide a fluid sample into the output channel.

33. The cartridge module of any preceding clause or example comprising a plurality of sources and/or source supply channels connected to one of the volumes at one lateral side of the volumes, wherein the ramp extends opposite to the supply channels and/or sources.

34. The cartridge module of any preceding clause or example wherein prior to usage the volumes are dry and at least one volume comprises a lyophilized reagent and/or lyophilized paramagnetic bead.

35. The cartridge module of any preceding clause or example wherein the mixing chamber comprises a lyophilized reagent and/or lyophilized paramagnetic beads.

36. The cartridge module of any preceding clause or example comprising at least one ambient air vent adapted to facilitate air flow while impeding liquid flow between at least one of the mixing chamber and ambient air, and the fluidic isolation chamber and ambient air.

37. The cartridge module of any preceding clause or example having a narrow form factor, wherein the mixing chamber, fluidic isolation chamber and output channel have a total height being at least three times a maximum cross sectional width of the widest volume.

38. The cartridge module of any preceding clause or example wherein the mixing chamber is a mixing and heating chamber adapted to exchange heat and/or cold.

39. The cartridge module of any preceding clause or example wherein the mixing chamber comprises a pressure source connected to an actuator to actuate the pressure source, and/or a mixer and a mixer actuator to actuate the mixer.

40. The cartridge module of clause 39 comprising a valve between the mixing chamber and fluidic isolation chamber to release mixed composition into the fluidic isolation chamber wherein the mixer and/or pressure source are adapted to open the valve upon actuation.

41. The cartridge module of any preceding clause or example comprising a liquid tight input seal cap to seal, open and reseal the input.

42. The cartridge module of any preceding clause or example comprising a liquid tight output seal valve to seal, open and reseal the output.

43. The cartridge module of any preceding clause or example wherein the output seal valve is biased to be opened against the bias force and to reseal at release.

44. The cartridge module of any preceding clause or example wherein the output channel comprises a capillary channel and is arranged to dispense processed sample fluid from its output tip upon unsealing the tip.

45. A cartridge comprising a plurality of cartridge modules of any preceding clause or example, the plurality of cartridge modules arranged linearly in series at a regular pitch of approximately 20 mm or less.

46. The cartridge of any clause or example or example comprising a frame to hold the modules 1 at the regular pitch.

47. A cartridge module to purify nucleic acids, comprising a sample input and an output;

interconnected volumes linearly stacked in series between said input and output, the volumes comprising a mixing chamber connected to the sample input, a fluidic isolation chamber connected to the mixing chamber downstream of the mixing chamber, and an output channel connected to the fluidic isolation chamber downstream of the fluidic isolation chamber and leading to the output, the output channel of narrower average diameter than the fluidic isolation and mixing chamber; and a valve forming a barrier between the mixing chamber and the fluidic isolation chamber to be opened to release mixed fluids and/or particles from the mixing chamber into the fluidic isolation chamber.

48. The cartridge module of any preceding clause or example wherein the volumes are arranged to, during use and with open fluidic connection, directly communicate with each other, to provide for a free flow between the volumes in a direction of gravity and towards the output.

49. The cartridge module of any preceding clause or example wherein the output channel comprises a capillary channel that provides for capillary action, and is sealed at its downstream end by a seal cap.

50. The cartridge module of any preceding clause or example comprising paramagnetic beads provided in and/or connected to the mixing chamber, a wash buffer source connected downstream of a downstream portion of the fluidic isolation chamber to, in use, provide wash buffer to the downstream portion of the fluidic isolation chamber.

51. The cartridge module of any preceding clause or example comprising a series of sources containing reagents, buffers or gases, the sources being in connection with the volumes.

52. The cartridge module of any preceding clause or example wherein at least one source comprises a valve component being at least one of a non-newtonian fluid and/or gas, to provide for a non-newtonian fluid and/or gas bubble plug, respectively, in the output channel, at least partially kept in place by the capillary action of the output channel.

53. The cartridge module of any preceding clause or example having a maximum external height being at least five times greater than a maximum external width.

54. The cartridge module of any preceding clause or example wherein each of the volumes is surrounded by walls parallel to and/or at obtuse angles with the linear stacking direction to avoid trapping and/or impeding the flow of fluids and particles.

55. The cartridge module of any preceding clause or example wherein the fluidic isolation chamber converges in the downstream direction to transition into the output channel.

56. The cartridge module of any preceding clause or example comprising a series of blistered sources connected to the fluidic isolation chamber and/or the output channel, the blistered sources attached to a support surface at a lateral side of the fluidic isolation chamber and/or the output channel.

57. A cartridge module to isolate biological components from a pre-mixed biological sample using particulate substrate, comprising a fluidic isolation chamber to receive a pre-mixed biological sample, a capillary output needle to dispense biological components isolated from the sample in a direct open fluidic connection with, and downstream of, the fluidic isolation chamber so that the fluidic isolation chamber converges into the capillary output needle, at least one source provided laterally from the fluidic isolation chamber and/or output needle, and connected the output needle, including a seal adapted so that, upon actuation, the contents of the source are released into the output channel, the at least one of the source containing a volume of wash buffer that upon release into the output channel occupies a downstream portion of the fluidic isolation chamber.

58. The cartridge module of any preceding clause or example comprising a mixing chamber upstream of the fluidic isolation chamber, the mixing chamber to lyse a biological sample and associate separated biological components with particulate substrate, and a valve downstream of the mixing chamber to directly release lysed biological sample onto wash buffer in the fluidic isolation chamber.

59. The cartridge module of any preceding clause or example comprising a plurality of sources contains at least one of a non-newtonian fluid; a reconstitution buffer to reconstitute a master mix reagent; and/or a wet or dry master mix reagent.

The invention claimed is:

1. A sample preparation cartridge module comprising:

a biological sample input and an output; and a plurality of interconnected chambers arranged in series along a linear direction between the biological sample input and the output, the plurality of interconnected chambers comprising:

a mixing chamber, connected to the biological sample input, to contain and mix a composition comprising a biological sample and a particulate substrate, the biological sample including a biological component, a fluidic isolation chamber, connected to the mixing chamber downstream of the mixing chamber, to separate, from the biological sample, the particulate substrate and the biological component, wherein the mixing chamber and fluidic isolation chamber are within a single body and are separated by a single openable barrier positioned at a direct interface between the mixing chamber and the fluidic isolation chamber, and wherein the mixing chamber and the fluidic isolation chamber are stacked along the linear direction and arranged to, during use, directly communicate with each other only through the single openable barrier, without separate longitudinal fluid channels in between, and an output channel connected to the fluidic isolation chamber downstream of the fluidic isolation chamber and leading to the output.

2. The cartridge module of claim 1 wherein the particulate substrate is configured to be associated with the biological component, to isolate the biological component from the biological sample.

3. The cartridge module of claim 2 wherein the particulate substrate comprises magnetic beads and the biological component comprises nucleic acids.

4. The cartridge module of claim 1 further comprising at least one supply channel connected to the plurality of interconnected chambers, wherein the at least one supply channel is at least one of (i) connected to the plurality of interconnected chambers at a downstream portion of the fluidic isolation chamber to release at least one buffer and/or reagent at the downstream portion of the fluidic isolation chamber, or (ii) connected to the plurality of interconnected chambers downstream of the downstream portion of the fluidic isolation chamber to release the at least one buffer and/or reagent downstream of the downstream portion of the fluidic isolation chamber.

5. The cartridge module of claim 4 wherein a plurality of supply channels and/or sources, separate from the mixing chamber and the fluidic isolation chamber, is connected to the output channel.

6. The cartridge module of claim 1 further comprising at least one source containing at least one of a buffer, a reagent, a lyophilized reagent, a non-newtonian fluid, and/or a gas, the at least one source connected to, or provided in, the plurality of interconnected chambers.

7. The cartridge module of claim 6 wherein the at least one source comprises a breakable seal configured to open upon actuation, the at least one source being fluidically connected to the output channel through a corresponding supply channel when the breakable seal is open.

8. The cartridge module of claim 1 further comprising a valve between the mixing chamber and the fluidic isolation chamber, the valve configured to release mixed composition into the fluidic isolation chamber.

9. The cartridge module of claim 1 wherein the cartridge module is adapted to have a use orientation whereby the linear direction is approximately parallel to a direction of gravity when the cartridge module is in use.

10. The cartridge module of claim 1 wherein the plurality of interconnected chambers comprises at least one partially converging wall that is parallel to and/or at obtuse angles with the linear direction to avoid trapping and/or impeding the flow of fluids and particles through the plurality of interconnected chambers.

11. The cartridge module of claim 1 wherein the fluidic isolation chamber converges in the linear direction to transition into the output channel, the fluidic isolation chamber and the output channel providing a continuous volume.

12. The cartridge module of claim 1 wherein the output channel comprises a capillary channel that is configured to provide capillary action.

13. The cartridge module of claim 1 wherein the fluidic isolation chamber comprises a ramp provided at a lateral side in at least a downstream portion of the fluidic isolation chamber, the ramp extending, in at least one of a use orientation or an upright orientation of the cartridge module, under an output opening of the mixing chamber to the fluidic isolation chamber, so that fluids and the particulate substrate are released from the mixing chamber above the ramp rather than above an entrance to the output channel.

14. The cartridge module of claim 1 wherein a downstream portion of the mixing chamber converges towards an output opening of the mixing chamber that is to fluidically interface with the fluidic isolation chamber.

15. The cartridge module of claim 1 further comprising a source of wash buffer connected to the fluidic isolation chamber to supply the wash buffer to a downstream portion of the fluidic isolation chamber, so that a mixed composition in the mixing chamber is released from the mixing chamber on top of the wash buffer.

16. The cartridge module of claim 15 further comprising a wash buffer supply channel, connected to the source of wash buffer and to the output channel, to supply the wash buffer to a downstream portion of the fluidic isolation chamber, and an openable seal between the output channel and the source of wash buffer.

17. The cartridge module of claim 15 wherein the wash buffer has at least one of:

a higher density than a lysate, or a density of at least approximately 1.05 g/ml or at least approximately 1.15 g/ml.

18. The cartridge module of claim 1 further comprising at least one source containing a reagent, the reagent to be supplied to the output channel, for the cartridge module to dispense isolated biological components with the reagent from the output.

19. The cartridge module of claim 18 wherein the reagent comprises at least one of a lyophilized reagent and a reconstitution buffer, and wherein the source is connected to a supply channel connected to the output channel.

* * * * *